United States Patent [19]
Hasegawa

[11] Patent Number: 5,355,519
[45] Date of Patent: Oct. 11, 1994

[54] FADING SIMULATION METHOD AND FADING SIMULATOR

[75] Inventor: Junichi Hasegawa, Kawasaki, Japan

[73] Assignee: Fujitsu Limited, Kawasaki, Japan

[21] Appl. No.: 114,686

[22] Filed: Aug. 31, 1993

[30] Foreign Application Priority Data

Mar. 4, 1993 [JP] Japan .................................. 5-043760

[51] Int. Cl.⁵ ............................................ H04B 17/00
[52] U.S. Cl. .................................. 455/52.3; 455/67.7
[58] Field of Search ........................ 455/52.1, 52.3, 65, 455/67.1, 67.3, 67.6, 304, 306

[56] References Cited

FOREIGN PATENT DOCUMENTS 0111435  6/1984  Japan .

OTHER PUBLICATIONS

A Multipath Fading Simulator for Mobile Radio by Arredondo et al.

Primary Examiner—Reinhard J. Eisenzopf
Assistant Examiner—Mary M. Lin

[57] ABSTRACT

The invention provides a fading simulator method and a fading simulator by which the attenuation ratio is not varied and the fading characteristic of a wide band can be realized stably even when the notch frequency sweeps. A fading simulator is interposed between a transmitter and a receiver, and a signal from the transmitter is inputted to first and second path artificial circuits of the fading simulator. In the first path artificial circuit, the attenuation amount of a first variable attenuator is controlled to control the amplitude of the signal passing therethrough, and the signal is delayed by a first delay circuit. Meanwhile, in the second path artificial circuit, a variable phase shifter is controlled to control the phase of the signal passing therethrough, and the attenuation amount at a second variable attenuator is controlled in accordance with a signal obtained by addition of an amplitude characteristic leveling amplitude correction value to an amplitude control signal, whereafter the passing signal is delayed by a second delay circuit. The signals from the first and second path artificial circuits are composed by a composer, and the thus composed signal is inputted to the receiver.

14 Claims, 16 Drawing Sheets

FREQUENCY CHARACTERISTIC OF FIRST PATH

FREQUENCY CHARACTERISTIC OF SECOND PATH

OUTPUT NOTCH WAVEFORM (WITH FREQUENCY CHARACTERISTIC ABOVE); VARIATION OF NOTCH WHEN INFINITE PHASE SHIFTER IS VARIED TO VARY NOTCH FREQUENCY

FREQUENCY CHARACTERISTIC OF FIRST PATH

FREQUENCY CHARACTERISTIC OF SECOND PATH

OUTPUT NOTCH WAVEFORM (WITH FREQUENCY CHARACTERISTIC SHOWN ABOVE); VARIATION OF NOTCH WHEN INFINITE PHASE SHIFTER IS VARIED TO VARY NOTCH FREQUENCY

FADING SIMULATION METHOD AND FADING SIMULATOR

BACKGROUND OF THE INVENTION

This invention relates to a fading simulation method and a fading simulator.

Digital radio communication sometimes suffers from an error caused by distortion in waveform arising from selective fading wherein the level drops in a particular frequency since it employs frequencies of a band wider than that of FM (frequency modulation) communication. Therefore, it is necessary to confirm a performance of a radio equipment with regard to fading in advance by way of testing, and to this end, a fading simulator is used in such a manner as seen in FIG. 14. Referring to FIG. 14, a fading simulator 82 is interposed between a transmitter 81 and a receiver 83. A transmission signal from the transmitter 81 is inputted to the fading simulator 82, in which waveform distortion similar to that which is caused by fading is applied to the transmission signal to artificially cause fading. The output of the fading simulator 82 is received by the receiver 83 thereby to conduct a performance test of the radio system with regard to fading.

FIG. 15 is a block diagram showing a general construction of such fading simulator. Referring to FIG. 15, the fading simulator includes a distributor 91 for distributing an input signal. A first path 201 is formed from a circuit from the distributor 91 to a composer 98 by way of a first variable attenuator 92, a delay compensator 93 and a delay element 94 while a second path 202 is formed from another circuit from the distributor 91 to the composer 98 by way of an infinite phase shifter 95, a second variable attenuator 96 and another delay element 97.

Here, the first variable attenuator 92 attenuates the amplitude of a signal passing the first path 201, and the delay compensator 93 and the delay element 94 set a delay time for a signal passing the first path 201.

The infinite phase shifter 95 varies the phase of a signal passing the second path 202 to vary the notch frequency of fading. The second variable attenuator 96 attenuates the amplitude of a signal passing the second path 202. The delay element 97 sets the delay time of a signal passing the second path 202.

The composer 98 composes signals from the first and second paths 201 and 202. The fading simulator shown in FIG. 15 further includes a variable attenuator 99 for attenuating the amplitude of a signal composed by the composer 98 to vary the gain between the input and the output of the fading simulator.

The fading simulator further includes a control section 100 which includes phase control means 101, first amplitude control means 102, second amplitude control means 103 and level control means 104.

The phase control means 101 controls the infinite phase shifter 95 to control the phase of a signal passing the second path 202.

The first amplitude control means 102 controls the amount of attenuation of the first variable attenuator 92 to control the amplitude of a signal passing the first path 201. The second amplitude control means 103 controls the amount of attenuation of the second variable attenuator 96 to control the amplitude of a signal passing the second path 202.

The level control means 104 controls the amount of attenuation of the amplitude of a signal at the variable attenuator 99.

In the fading simulator of the construction described above, an input signal is distributed to the first and second paths 201 and 202 by the distributor 91. In the first path 201, the input signal is first attenuated in amplitude by the first variable attenuator 92, which is controlled by the first amplitude control means 102, and then delayed by the delay compensator 93 and the delay element 94. Meanwhile, in the second path 202, the input signal is first varied in phase by the infinite phase shifter 95, which is controlled by the phase control means 101, and then attenuated in amplitude by the second variable attenuator 96, which is controlled by the second amplitude control means 103, whereafter it is delayed by the delay element 97. The composer 98 composes signals from the first and second paths 201 and 202, and the variable attenuator 99 attenuates the amplitude of an output signal of the composer 98 to vary the gain between the input and the output of the fading simulator under the control of the level control means 104.

With the fading simulator of the construction described above, however, when a wide band is used, since an infinite phase shifter is used as a phase shifter, the second path 202 exhibits such a frequency amplitude characteristic as seen from the waveform of FIG. 16(b), which is different from such a flat characteristic as of a frequency amplitude characteristic of the first path 201 shown in FIG. 16(a). Consequently, there is a problem in that the frequency amplitude characteristic of the second path 202 described above varies the amount of attenuation when the notch frequency sweeps.

More particularly, where the difference in delay time between the first and second paths 201 and 202 is represented by $\tau_1$, the amplitude ratio by $\rho_1$, the phase difference by $\theta_1$ and the amplitude of the first path 201 by A, the output amplitude characteristic $A(\omega)$ is given by the following equation:

$$A(\omega) = A(1 + 2\rho \cos(2\pi f \tau_1 + \theta_1) + \rho_1^2)^{\frac{1}{2}}$$

where f is a frequency.

Further, the condition for $A(\omega)$ to be minimized (for the notch attenuator amount to be maximized) is that $2\pi f \tau_1 + \theta_1 = \pi$, and in this instance, $A(\omega) = A((1-\rho)^2)^{\frac{1}{2}} = A(1-\rho)$, and the attenuation ratio is given by $A(\omega)/A = 1 - \rho$. Further, if this is converted into dB (decibel), then $20\log(A(\omega)/A) = 20\log(1-\rho)$.

If, for example, $\rho = 0.97$ (−0.26 dB), then as indicated by k in the waveform diagram of FIG. 16(c), the attenuation amount at a notch point $f_0$ is given by $20\log(1-0.97) = -30$ dB.

Then, if $\theta_1$ is varied so that the notch point is adjusted to $f = f_0 - \Delta f$, then the amplitude characteristic of the second path 202 changes, when −1 dB from the point $f_0$ as seen from FIG. 16(b), to −0.26 dB −1, dB = −1.26 dB, that is, $\rho = 0.86$, and the attenuation amount then changes to $20\log(1-0.86) = -17$ dB as seen from j in FIG. 16(c). A similar subject occurs with an alternative case wherein the notch point is varied to $f = f_0 + \Delta f$.

SUMMARY OF THE INVENTION

It is an object of the present invention to provide a fading simulator method and a fading simulator by which the attenuation ratio is not varied and the fading characteristic of a wide band can be realized stably even when the notch frequency sweeps.

In order to attain the object described above, according to an aspect of the present invention, there is provided a fading simulation method which uses a fading simulator interposed between a transmitter and a receiver of a radio system and including a distributor for distributing an input signal, a first path artificial circuit including a first variable attenuator and a first delay circuit for receiving the input signal distributed by the distributor, a second path artificial circuit including a variable phase shifter, a second variable attenuator and a second delay circuit for receiving the input signal distributed by the distributor, and a composer for composing signals from the first path artificial circuit and the second path artificial circuit, to conduct a performance test of the radio system for fading by inputting a signal from the transmitter to the fading simulator so as to artificially produce fading by the fading simulator and receiving the output of the fading simulator by the receiver, comprising the steps of inputting an input signal from the transmitter to the fading simulator, the input signal being distributed by the distributor so that it is inputted to the first path artificial circuit and the second path artificial circuit, controlling, in the first path artificial circuit, the amount of attenuation of the first variable attenuator to control the amplitude of a signal passing the first path artificial circuit and delaying the passing signal by the first delay circuit, controlling, in the second path artificial circuit, the variable phase shifter to control the phase of a signal passing the second path artificial circuit, controlling the amount of attenuation at the second variable attenuator in accordance with a signal obtained by addition to an amplitude control signal of an amplitude correction value set for leveling the amplitude characteristic of the second path artificial circuit in accordance with notch frequency information to control the amplitude of a signal passing the second path artificial circuit, and delaying the passing signal by the second delay circuit, composing signals from the first path artificial circuit and the second path artificial circuit by composer, and inputting the signal obtained by the composition to the receiver.

According to another aspect of the present invention, there is provided a fading simulator, which comprises a distributor for distributing an input signal, a first path artificial circuit including a first variable attenuator and a first delay circuit for receiving the input signal distributed by the distributor, a second path artificial circuit including a variable phase shifter, a second variable attenuator and a second delay circuit for receiving the input signal distributed by the distributor, a composer for composing signals from the first path artificial circuit and the second path artificial circuit, first amplitude control means for controlling the amount of attenuation of the first variable attenuator to control the amplitude of a signal passing the first path artificial circuit, second amplitude control means for controlling the amount of attenuation of the second variable attenuator to control the amplitude of a signal passing the second path artificial circuit, phase control means for controlling the variable phase shifter to control the phase of a signal passing the second path artificial circuit, frequency information detection means for detecting notch frequency information from variable phase shifter control information received from the phase control means, amplitude correction value setting means for setting an amplitude correction value for leveling the amplitude characteristic of the second path artificial circuit in accordance with the notch frequency information detected by the frequency information detection means, and addition means for adding the amplitude correction value set by the amplitude correction value setting means to a control signal from the second amplitude control means.

Each of the first amplitude control means and the second amplitude control means may be constructed as storage means in which digital amplitude control data are stored at predetermined addresses while the phase control means is constructed as storage means in which digital phase control data are stored at predetermined addresses and the amplitude correction value setting means is constructed as storage means in which digital amplitude correction value data are stored at predetermined addresses, and means for indicating address information to the storage means may constitute the frequency information detection means.

In this instance, the fading simulator may further comprise digital to analog conversion means for converting digital outputs of the storage means constituting the second amplitude control means and the amplitude correction value setting means into analog data, and the addition means may be constructed as analog addition means for adding analog data after conversion by the digital to analog conversion means.

Or alternatively, the addition means may be constructed as digital addition means for adding digital outputs of the storage means constituting the second amplitude control means and the amplitude correction value setting means, and the fading simulator may further comprise digital to analog conversion means for converting a digital output of the digital addition means into analog data.

The first delay circuit and the second delay circuit may each be constructed as a variable delay circuit.

In this instance, each of the variable delay circuits may include a plurality of delay elements having different delay times and a selector for selecting one of the delay elements, and the amplitude correction value setting means may include a plurality of amplitude correction value setting sections for setting amplitude correction values for leveling different amplitude characteristics of the second path artificial circuit obtained by selection of different ones of the delay elements, and a selector for selecting one of the amplitude correction value setting sections.

According to a further aspect of the present invention, there is provided a fading simulation method which uses a fading simulator interposed between a transmitter and a receiver of a radio system and including a distributor for distributing an input signal, a first path artificial circuit including a first variable attenuator and a first delay circuit for receiving the input signal distributed by the distributor, a second path artificial circuit including a variable phase shifter, a second variable attenuator and a second delay circuit for receiving the input signal distributed by the distributor, and a composer for composing signals from the first path artificial circuit and the second path artificial circuit, to conduct a performance test of the radio system for fading by inputting a signal from the transmitter to the fading simulator so as to artificially produce fading by the fading simulator and receiving the output of the fading simulator by the receiver, comprising the steps of inputting an input signal from the transmitter to the fading simulator, the input signal being distributed by the distributor so that it is inputted to the first path artificial circuit and the second path artificial circuit, controlling, in the first path artificial circuit, the amount of attenuation of the first variable attenuator to control the amplitude of a signal passing the first path artificial circuit in accordance with a signal obtained by addition to a first amplitude control signal of an amplitude correction value set for leveling the amplitude characteristic of the first path artificial circuit in accordance with notch frequency information and delaying the passing signal by the first delay circuit, controlling, in the second path artificial circuit, the variable phase shifter to control the phase of a signal passing the second path artificial circuit, controlling the amount of attenuation at the second variable attenuator in accordance with a signal obtained by addition to a second amplitude control signal of an amplitude correction value set for leveling the amplitude characteristic of the second path artificial circuit in accordance with notch frequency information to control the amplitude of a signal passing the second path artificial circuit, and delaying the passing signal by the second delay circuit, composing signals from the first path artificial circuit and the second path artificial circuit by the composer, and inputting the signal obtained by the composition to the receiver.

According to a still further aspect of the present invention, there is provided a fading simulator, which comprises a distributor for distributing an input signal, a first path artificial circuit including a first variable attenuator and a first delay circuit for receiving the input signal distributed by the distributor, a second path artificial circuit including a variable phase shifter, a second variable attenuator and a second delay circuit for receiving the input signal distributed by the distributor, a composer for composing signals from the first path artificial circuit and the second path artificial circuit, first amplitude control means for controlling the amount of attenuation of the first variable attenuator to control the amplitude of a signal passing the first path artificial circuit, second amplitude control means for controlling the amount of attenuation of the second variable attenuator to control the amplitude of a signal passing the second path artificial circuit, phase control means for controlling the variable phase shifter to control the phase of a signal passing the second path artificial circuit, frequency information detection means for detecting notch frequency information from variable phase shifter control information received from the phase control means, first amplitude correction value setting means for setting an amplitude correction value for leveling the amplitude characteristic of the first path artificial circuit in accordance with the notch frequency information detected by the frequency information detection means, first addition means for adding the amplitude correction value set by the first amplitude correction value setting means to a control signal from the first amplitude control means, second amplitude correction value setting means for setting an amplitude correction value for leveling the amplitude characteristic of the second path artificial circuit in accordance with the notch frequency information detected by the frequency information detection means, and second addition means for adding the amplitude correction value set by the second amplitude correction value setting means to a control signal from the second amplitude control means.

Each of the first amplitude control means and the second amplitude control means may be constructed as storage means in which digital amplitude control data are stored at predetermined addresses while the phase control means is constructed as storage means in which digital phase control data are stored at predetermined addresses and the first amplitude correction value setting means and the second amplitude correction value setting means are each constructed as storage means in which digital amplitude correction value data are stored at predetermined addresses, and means for indicating address information to the storage means may constitute the frequency information detection means.

In this instance, the fading simulator may further comprise first digital to analog conversion means for converting digital outputs of the storage means constituting the first amplitude control means and the first amplitude correction value setting means into analog data, the first addition means being constructed as analog addition means for adding analog data after conversion by the first digital to analog conversion means, and second digital to analog conversion means for converting digital outputs of the storage means constituting the second amplitude control means and the second amplitude correction value setting means into analog data, the second addition means being constructed as analog addition means for adding analog data after conversion by the second digital to analog conversion means.

Or alternatively, the first addition means may be constructed as digital addition means for adding digital outputs of the storage means constituting the first amplitude control means and the first amplitude correction value setting means and the fading simulator may further comprise third digital to analog conversion means for converting a digital output of the digital addition means into analog data, and the second addition means may be constructed as digital addition means for adding digital outputs of the storage means constituting the second amplitude control means and the second amplitude correction value setting means and the fading simulator may further comprise fourth digital to analog conversion means for converting a digital output of the digital addition means into analog data.

The first delay circuit and the second delay circuit may each be constructed as a variable delay circuit.

In this instance, each of the variable delay circuits may include a plurality of delay elements having different delay times and a selector for selecting one of the delay elements, and the first amplitude correction value setting means may include a plurality of amplitude correction value setting sections for setting amplitude correction values for leveling different amplitude characteristics of the first path artificial circuit obtained by selection of different ones of the delay elements, and a selector for selecting one of the amplitude correction value setting sections while the second amplitude correction value setting means includes a plurality of amplitude correction value setting sections for setting amplitude correction values for leveling different amplitude characteristics of the second path artificial circuit obtained by selection of different ones of the delay elements, and a selector for selecting one of the amplitude correction value setting sections.

With the fading simulation methods and the fading simulators, a fading characteristic of a wide band can be realized stably with a simple construction, and accordingly, fading simulation over a plurality of systems can be achieved by employment of the present invention. Further, since some frequency characteristic of an equipment is permitted by employment of the present invention, reduction in cost of hardware can be realized.

Further objects, features and advantages of the present invention will become apparent from the following detailed description when read in conjunction with the accompanying drawings in which like parts or elements are denoted by like reference characters.

Figure 1:
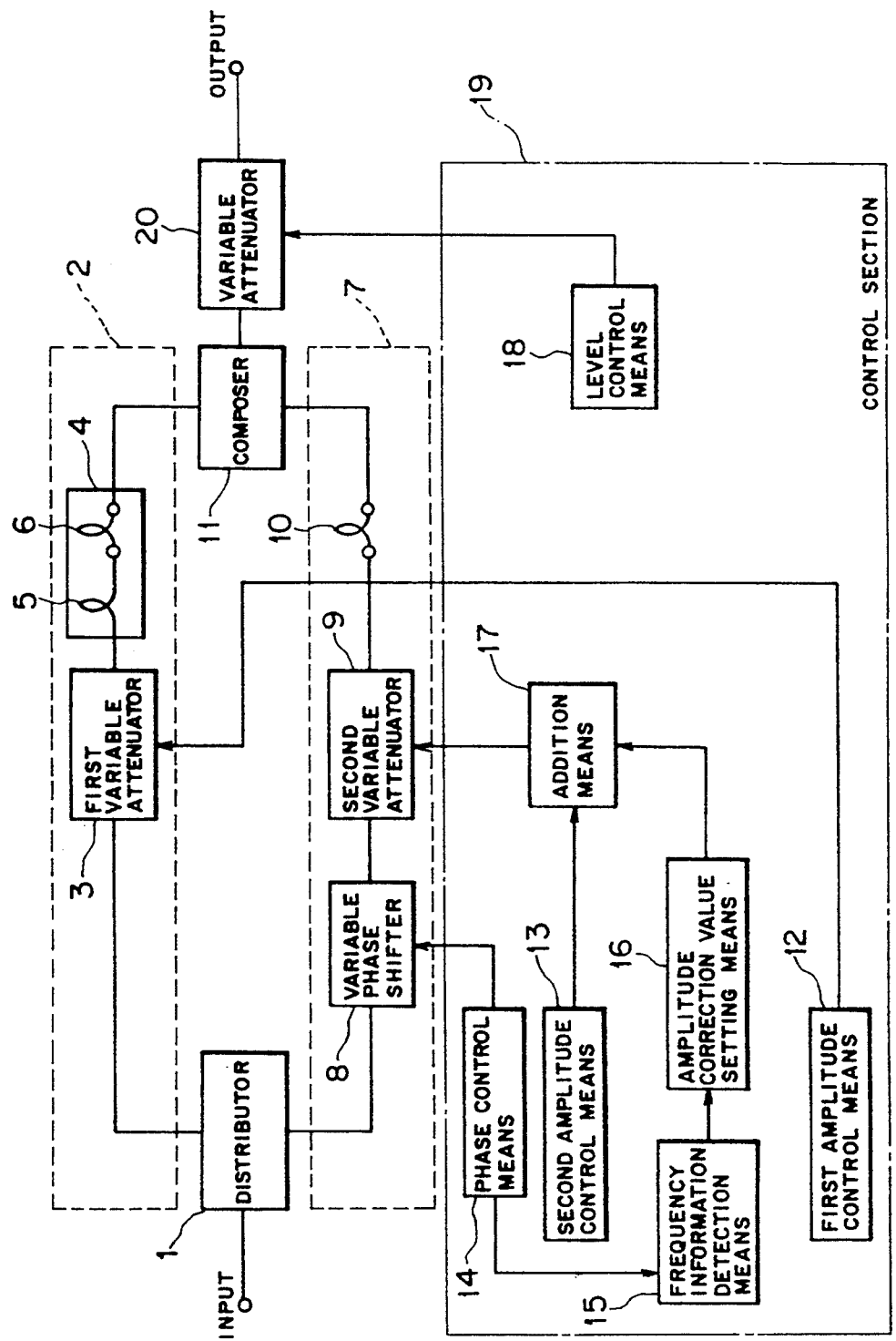
FIG. 1 is a block diagram illustrating a principle of the present invention.

DESCRIPTION OF THE PREFERRED EMBODIMENTS a. Description of the Principles of the Invention Referring first to FIG. 1, there is shown a principle of a fading simulator of the present invention. The fading simulator includes a distributor 1 for distributing an input signal from a transmitter not shown.

A first path artificial circuit 2 receives an input signal distributed by the distributor 1 and includes a first variable attenuator 3, and a first delay circuit 4 which in turn includes a delay compensator 5 and a delay element 6.

A second path artificial circuit 7 receives an input signal distributed by the distributor 1 and includes a variable phase shifter 8, a second variable attenuator 9 and a second delay circuit 10.

A composer 11 composes signals from the first and second path artificial circuits 2 and 7.

First amplitude control means 12 controls the amount of attenuation of the first variable attenuator 3 to control the amplitude of a signal passing the first path artificial circuit 2.

Second amplitude control means 13 controls the amount of attenuation of the second variable attenuator 9 to control the amplitude of a signal passing the second path artificial circuit 7.

Phase control means 14 controls the variable phase shifter 8 to control the phase of a signal passing the second path artificial circuit 7.

Frequency information detection means 15 detects notch frequency information from control information for the variable phase shifter 8 from the phase control means 14.

Amplitude correction value setting means 16 sets, in accordance with notch frequency information detected by the frequency information detection means 15, an amplitude correction value for leveling the amplitude characteristic of the second path artificial circuit 7.

Addition means 17 adds an amplitude correction value set by the amplitude correction value setting means 16 to a control signal from the second amplitude control means 13.

Level control means 18 controls the amount of attenuation of the amplitude of a signal at the variable attenuator 20.

The first amplitude control means 12, second amplitude control means 13, phase control means 14, frequency information detection means 15, amplitude correction value setting means 16, addition means 17 and level control means 18 generally constitute a control section 19.

A variable attenuator 20 attenuates the amplitude of a signal composed by the composer 11, and the output of it is transmitted to a receiver not shown.

Each of the first and second amplitude control means 12 and 13 may be constructed as storage means in which desired digital amplitude control data are stored at predetermined addresses; the phase control means 14 may be constructed as storage means in which desired digital phase control data are stored at predetermined addresses; the amplitude correction value setting means 16 may be constructed as storage means in which desired digital amplitude correction value data are stored at predetermined addresses; and means for indicating address information to the storage means mentioned above may constitute the frequency information detection means 15.

Further, in this instance, digital to analog conversion means for converting digital outputs of the storage means, which constitute the second amplitude control means 13 and the amplitude correction value setting means 16, into analog data may be provided, and the addition means 17 may be constructed as analog addition means which adds analog data obtained by digital to analog conversion by the digital to analog conversion means.

Or alternatively, the addition means 17 may be constructed as digital addition means which adds digital outputs of the storage means constituting the second amplitude control means 13 and the amplitude correction value setting means 16, and digital to analog conversion means for converting a digital output of the digital addition means into analog data may be provided.

The first and second delay circuits 4 and 10 may each be constructed as a variable delay circuit.

In this instance, the variable delay circuit may be include a plurality of delay elements having different delay times and a selector for selecting one of the delay elements, and the amplitude correction value setting means 16 may include a plurality of amplitude correction value setting sections for setting amplitude correction values for leveling different amplitude characteristics of the second path artificial circuit obtained by section of different ones of the delay elements, and a selector for selecting one of the amplitude correction value setting sections.

In the fading simulator described above, an input signal from the transmitter not shown is received and distributed by the distributor 1 to the first and second path artificial circuits 2 and 7. Then, in the first path artificial circuit 2, the first amplitude control means 12 controls the amount of attenuation of the first variable attenuator 3 to control the amplitude of the input signal, which is to pass the first path artificial circuit 2. Then, the signal to pass is delayed by the first delay circuit 4. Meanwhile, in the second path artificial circuit 7, the phase control means 14 controls the variable phase shifter 8 to control the phase of the signal passing therethrough, and then the amount of attenuation is controlled by the second variable attenuator 9 to control the amplitude of the signal to pass through the second path artificial circuit 7 in accordance with a signal, which is obtained by adding, by the addition means 17, to a control signal transmitted thereto from the second amplitude control means 13, an amplitude correction value set by the amplitude correction value setting means 16 in order to level the amplitude characteristic of the second path artificial circuit 7 in accordance with notch frequency information detected by the frequency information detection means 15 from control information for the variable phase shifter 8 by the phase control means 14. Then, the output of the second variable attenuator 9 is delayed by the second delay circuit 10.

The composer 11 composes the signals from the first and second path artificial circuits 2 and 7, and the amplitude of a signal composed by the composer 11 is attenuated by the variable attenuator 20 under the control of the level control means 18. The output of the variable attenuator 20 is transmitted to the receiver not shown.

It is to be noted that, where each of the first and second amplitude control means 12 and 13 is constructed as storage means in which desired digital amplitude control data are stored at predetermined addresses; the phase control means 14 is constructed as storage means in which desired digital phase control data are stored at predetermined addresses; the amplitude correction value setting means 16 is constructed as storage means in which desired digital amplitude correction value data are stored at predetermined addresses; and means for indicating address information to the storage means mentioned above constitutes the frequency information detection means 15, the first and second amplitude control means 12 and 13 output, in response to address information indicated by the frequency information detection means 15, digital amplitude control data from the addresses thereof indicated by the address information; the phase control means 14 outputs digital phase control data from the address indicated by the address information; and the amplitude correction value setting means 16 outputs digital amplitude correction value data from the address indicated by the address information.

Further, in this instance, where the digital to analog conversion means for converting digital outputs of the storage means which constitute the second amplitude control means 13 and the amplitude correction value setting means 16 are provided and the addition means 17 is constructed as analog addition means which adds analog data obtained by digital to analog conversion by the digital to analog conversion means, digital outputs of the storage means constituting the second amplitude control means 13 and the amplitude correction value setting means 16 are converted into analog data by the digital to analog conversion means and then added by the addition means 17.

Alternatively, where the addition means 17 is constructed as digital addition means which adds digital outputs of the storage means constituting the second amplitude control means 13 and the amplitude correction value setting means 16 and digital to analog conversion means for converting a digital output of the digital addition means into analog data is provided, the addition means 17 adds digital outputs of the second amplitude control means 13 and the amplitude correction value setting means 16, and a digital output of the addition means 17 is converted into analog data by the digital to analog conversion means.

Further, where the first and second delay circuits 4 and 10 are each constructed as a variable delay circuit, the first and second delay circuits 4 and 10 can vary the respective delay times. Further, in this instance, where the variable delay circuit includes a plurality of delay elements having different delay times and a selector for selecting one of the delay elements and the amplitude correction value setting means 16 includes a plurality of amplitude correction value setting sections for setting amplitude correction values for leveling different amplitude characteristics of the second path artificial circuit 7 obtained by selection of different ones of the delay elements, and a selector for selecting one of the amplitude correction value setting sections, the delay time of each of the variable delay circuits is determined by one of the delay elements selected by the corresponding selector, and a different amplitude characteristic of the second path artificial circuit 7 obtained by selection of a different delay element is leveled with an amplitude correction value set by one of the amplitude correction value setting sections selected by the corresponding selector in the amplitude correction value setting means 16.

Figure 2:
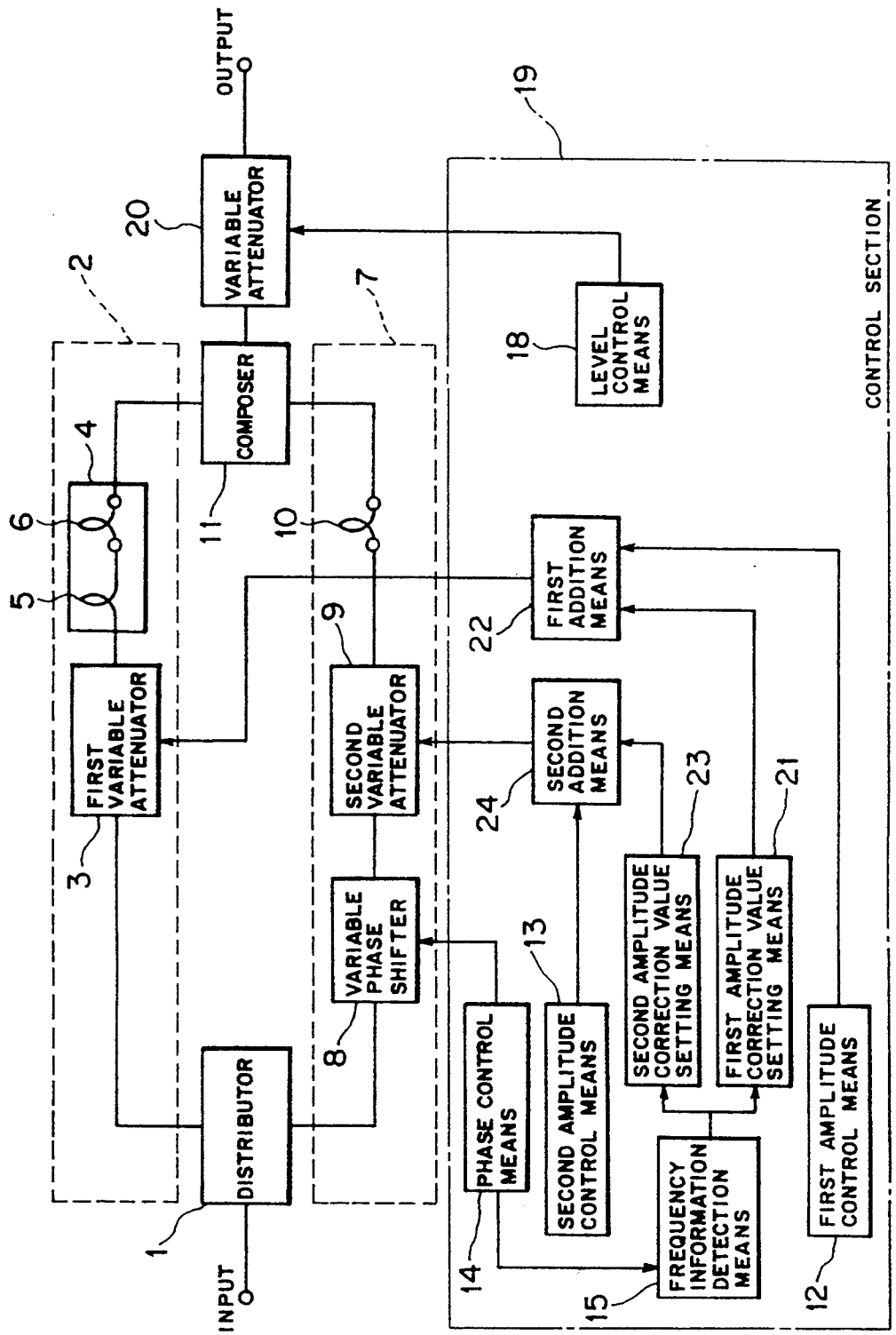
FIG. 2 is a block diagram illustrating another principle of the present invention.

FIG. 2 illustrates another principle of a fading simulator of the present invention. Referring to FIG. 2 the fading simulator shown includes several common components to the fading simulator described above with reference to FIG. 1. Such common components are denoted by like reference numerals and overlapping description thereof is omitted herein to avoid redundancy. The fading simulator of FIG. 2 is different from the fading simulator of FIG. 1 in that the control section 19 thereof includes, in place of the amplitude correction value setting means 16 and the addition means 17, first and second amplitude correction value setting means 21 and 23 and first and second addition means 22 and 24.

In particular, the first amplitude correction value setting means 21 sets, in accordance with notch frequency information detected by the frequency information detection means 15, an amplitude correction value for leveling the amplitude characteristic of the first path artificial circuit 2. The first addition means 22 adds an amplitude correction value set by the first amplitude correction value setting means 21 to a control signal from the first amplitude control means 12.

Meanwhile, the second amplitude correction value setting means 23 sets, in accordance with notch frequency information detected by the frequency information detection means 15, an amplitude correction value for leveling the amplitude characteristic of the second path artificial circuit 7. The second addition means 24 adds an amplitude correction value set by the second amplitude correction value setting means 23 to a control signal from the second amplitude control means 13.

The first and second amplitude control means 12 and 13 may each be constructed as storage means in which desired digital amplitude control data are stored at predetermined addresses; the phase control means 14 may be constructed as storage means in which desired digital phase control data are stored at predetermined addresses; the first and second amplitude correction value setting means 21 and 23 may each be constructed as storage means in which desired digital amplitude correction value data are stored at predetermined addresses; and means for indicating address information to the storage means may constitute the frequency information detection means 15.

Further, in this instance, first digital to analog conversion means for converting digital outputs of the storage means which constitute the first amplitude control means 12 and the first amplitude correction value setting means 21 may be provided and the first addition means 22 may be constructed as analog addition means which adds analog data obtained by digital to analog conversion by the first digital to analog conversion means while second digital to analog conversion means for converting digital outputs from the storage means which constitute the second amplitude control means 13 and the second amplitude correction value setting means 23 is provided and the second addition means 24 is constructed as analog addition means which adds analog data obtained by digital to analog conversion by the second digital to analog conversion means.

Or alternatively, the first addition means 22 may be constructed as digital addition means which adds digital outputs of the storage means constituting the first amplitude control means 12 and the first amplitude correction value setting means 21 and third digital to analog conversion means for converting a digital output of the digital addition means into analog data may be provided while the second addition means 24 is constructed as digital addition means which adds digital outputs of the storage means constituting the second amplitude control means 13 and the second amplitude correction value setting means 23 and fourth digital to analog conversion means for converting a digital output of the digital addition means into analog data is provided.

The first and second delay circuits 4 and 10 may each be constructed as a variable delay circuit.

In this instance, the variable delay circuit may include a plurality of delay elements having different delay times and a selector for selecting one of the delay elements and the first amplitude correction value setting means 21 may include a plurality of amplitude correction value setting sections for setting amplitude correction values for leveling different amplitude characteristics of the first path artificial circuit 2 obtained by selection of different ones of the delay elements, and a selector for selecting one of the amplitude correction value setting sections while the second amplitude correction value setting means 23 includes a plurality of amplitude correction value setting sections for setting amplitude correction values for leveling different amplitude characteristics of the second path artificial circuit 7 obtained by selection of different ones of the delay elements, and a selector for selecting one of the amplitude correction value setting sections.

In the fading simulator described above, an input signal from the transmitter not shown is received and distributed by the distributor 1 to the first and second path artificial circuits 2 and 7. In the first path artificial circuit 2, in order to control the amount of attenuation of the first variable attenuator 3 to control the amplitude of the input signal, which is to pass the first path artificial circuit 2, the first variable attenuator 3 controls the amplitude of the signal to pass therethrough in accordance with a signal, which is obtained by adding, by the first addition means 22, to a control signal transmitted thereto from the first amplitude control means 12, an amplitude correction value set by the first amplitude correction value setting means 21 in order to level the amplitude characteristic of the first path artificial circuit 2 in accordance with notch frequency information detected by the frequency information detection means 15 from control information for the variable phase shifter 8 by the phase control means 14. Then, the output of the first variable attenuator 3 is delayed by the first delay circuit 4.

Meanwhile, in the second path artificial circuit 7, the phase control means 14 controls the variable phase shifter 8 to control the phase of the signal passing therethrough, and then in order to control the amount of attenuation of the second variable attenuator 9 to control the amplitude of the input signal, which is to pass the second path artificial circuit 7, the second variable attenuator 9 controls the amplitude of the signal to pass therethrough in accordance with a signal, which is obtained by adding, by the second addition means 24, to a control signal transmitted thereto from the second amplitude control means 13, an amplitude correction value set by the second amplitude correction value setting means 23 in order to level the amplitude characteristic of the second path artificial circuit 7 in accordance with notch frequency information detected by the frequency information detection means 15 from control information for the variable phase shifter 8 by the phase control means 14. Then, the output of the second variable attenuator 9 is delayed by the second delay circuit 10.

The composer 11 composes the signals from the first and second path artificial circuits 2 and 7, and the amplitude of a signal composed by the composer 11 is attenuated by the variable attenuator 20 under the control of the level control means 18. The output of the variable attenuator 20 is transmitted to the receiver not shown.

It is to be noted that, where each of the first and second amplitude control means 12 and 13 is constructed as storage means in which desired digital amplitude control data are stored at predetermined addresses; the phase control means 14 is constructed as storage means in which desired digital phase control data are stored at predetermined addresses; the first and second amplitude correction value setting means 21 and 23 are each constructed as storage means in which desired digital amplitude correction value data are stored at predetermined addresses; and means for indicating address information to the storage means mentioned above constitutes the frequency information detection means 15, the first and second amplitude control means 12 and 13 output, in response to address information indicated by the frequency information detection means 15, digital amplitude control data from the addresses thereof indicated by the address information; the phase control means 14 outputs digital phase control data from the address indicated by the address information; and the first and second amplitude correction value setting means 21 and 23 output digital amplitude correction value data from the addresses indicated by the address information.

Further, in this instance, where the digital to analog conversion means for converting digital outputs of the storage means which constitute the first amplitude control means 12 and the first amplitude correction value setting means 21 are provided and the first addition means 22 is constructed as analog addition means which adds analog data obtained by digital to analog conversion by the first digital to analog conversion means while the digital to analog conversion means for converting digital outputs of the storage means which constitute the second amplitude control means 13 and the second amplitude correction value setting means 23 are provided and the second addition means 24 is constructed as analog addition means which adds analog data obtained by digital to analog conversion by the second digital to analog conversion means, digital outputs of the first amplitude control means 12 and the first amplitude correction value setting means 21 are converted into analog data by the first digital to analog conversion means and then added by the first addition means 22 while digital outputs of the second amplitude control means 13 and the second amplitude correction value setting means 23 are converted into analog data by the second digital to analog conversion means and then added by the second addition means 24.

Or alternatively, where the first addition means 22 is constituted as digital addition means which adds digital outputs of the storage means constituting the first amplitude control means 12 and the first amplitude correction value setting means 21 and third digital to analog conversion means for converting a digital output of the digital addition means into analog data is provided while the second addition means 22 is constructed as digital addition means which adds digital outputs of the storage means constituting the second amplitude control means 13 and the second amplitude correction value setting means 23 and fourth digital to analog conversion means for converting a digital output of the digital addition means into analog data is provided, the first addition means 22 adds digital outputs of the first amplitude control means 12 and the first amplitude correction value setting means 21 and a digital output of the first addition means 22 is converted into analog data by the third digital to analog conversion means while the second addition means 24 adds digital outputs of the second amplitude control means 13 and the second amplitude correction value setting means 23 and a digital output of the second addition means 24 is converted into analog data by the fourth digital to analog conversion means.

Further, where the first and second delay circuits 4 and 10 are each constructed as a variable delay circuit, the first and second delay circuits 4 and 10 can vary the respective delay times. Further, in this instance, where the variable delay circuit is constituted from a plurality of delay elements having different delay times and a selector for selecting one of the delay elements and the first amplitude correction value setting means 21 includes a plurality of amplitude correction value setting sections for setting amplitude correction values for leveling different amplitude characteristics of the first path artificial circuit 2 obtained by selection of different ones of the delay elements, and a selector for selecting one of the amplitude correction value setting sections while the second amplitude correction value setting means 23 includes a plurality of amplitude correction value setting sections for setting amplitude correction values for leveling different amplitude characteristics of the second path artificial circuit 7 obtained by selection of different ones of tile delay elements, and a selector for selecting one of the amplitude correction value setting sections, the delay time of each of the variable delay circuits is determined by one of the delay elements selected by the corresponding selector, and an amplitude characteristic of the first path artificial circuit 2 obtained by selection of a different delay element is leveled with an amplitude correction value set by one of the amplitude correction value setting sections selected by the corresponding selector in the first amplitude correction value setting means 21 while an amplitude characteristic of the second path artificial circuit 7 obtained by selection of a different delay element is leveled with an amplitude correction value set by one of the amplitude correction value setting sections selected by the corresponding selector in the second amplitude correction value setting means 23.

b. Description of the First Embodiment

Figure 3:
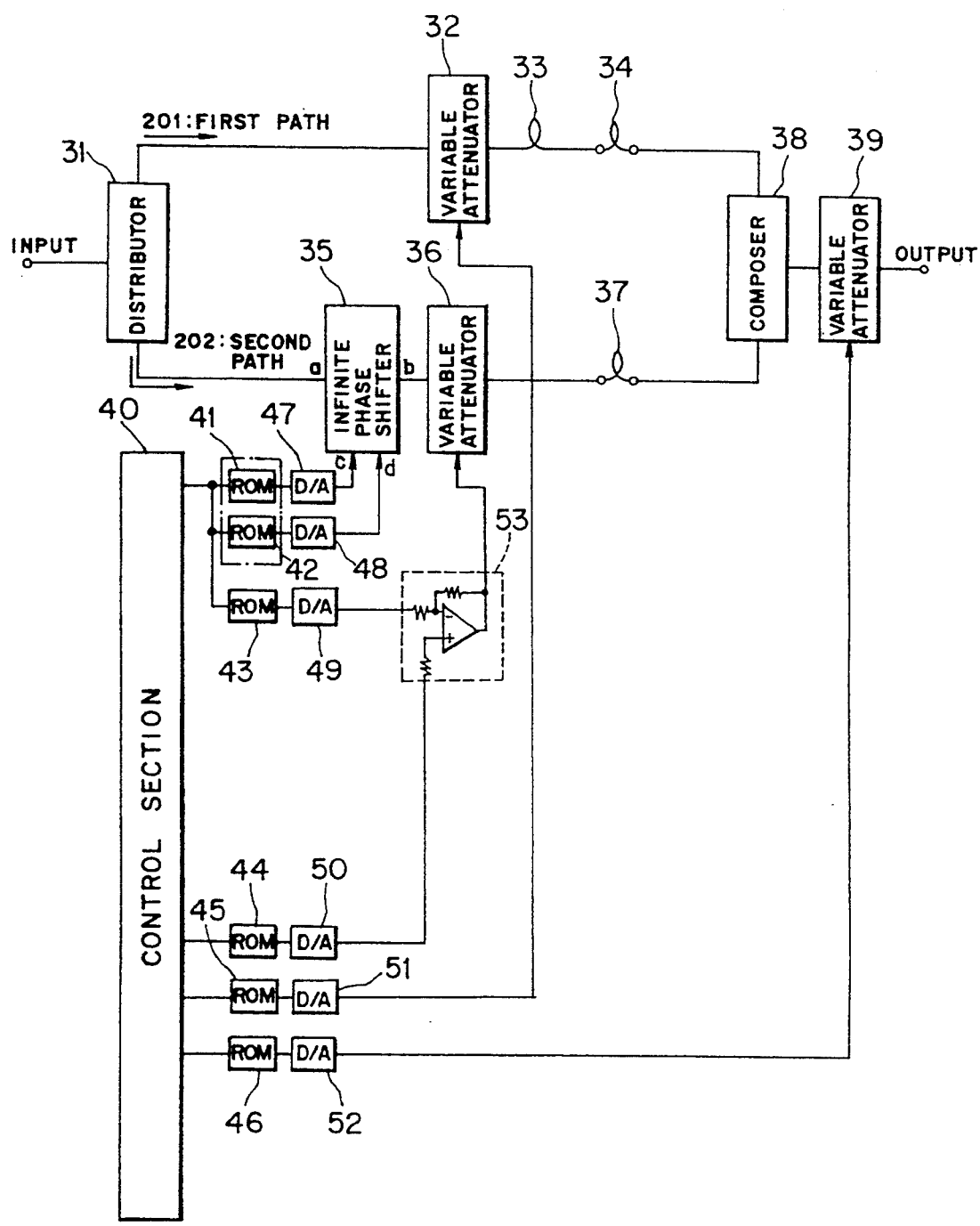
FIG. 3 is a block diagram of a fading simulator showing a first preferred embodiment of the present invention.

Referring now to FIG. 3, there is shown a fading simulator according to a first preferred embodiment of the present invention. The fading simulator shown includes a distributor 31 for distributing an input signal from a transmitter not shown (refer to FIG. 14).

A first path or first path artificial circuit 201 is formed from a circuit from the distributor 31 to a composer 38 by way of a first variable attenuator 32, a delay compensator 33 and a delay element 34 which constitutes a first delay circuit while a second path or second path artificial circuit 202 is formed from another circuit from the distributor 31 to the composer 38 by way of an infinite phase shifter 35, a second variable attenuator 36 and another delay element 37 which constitutes a second delay circuit.

Here, the first variable attenuator 32 attenuates the amplitude of a signal passing the first path 201, and the delay compensator 33 and the delay element 34 set the delay time of a signal to pass the first path 201.

The infinite phase shifter 35 varies the phase of a signal passing the second path 202 to vary the notch frequency of fading. The second variable attenuator 36 attenuates the amplitude of a signal passing the second path 202. The delay element 37 sets the delay time of a signal passing the second path 202.

The composer 38 composes signals from the first and second paths 201 and 202.

A variable attenuator 39 attenuates the amplitude of a signal composed by the composer 38 to vary the gain between the input and the output of the fading simulator.

A control section 40 delivers instructions for controlling the phase variation amount at the infinite phase shifter 35 and the attenuation amounts of the first and second variable attenuators 32 and 36 and the variable attenuator 39.

ROMs (read only memories) 41 to 46 individually serve as storage means. The ROM 41 stores cosine wave data while the ROM 42 stores sine wave data. The ROMs 41 and 42 constitute phase control means for controlling the infinite phase shifter 35 to control the phase of a signal passing the second path 202.

The ROM 43 stores amplitude correction value data corresponding to notch frequencies; the ROM 44 stores data regarding attenuation amount control for the second variable attenuator 36; the ROM 45 stores data regarding attenuation amount control for the first variable attenuator 32; and the ROM 46 stores data regarding attenuation amount control for the variable attenuator 39.

Accordingly, the ROM 43 constitutes amplitude correction value setting means for setting, in accordance with notch frequency information, an amplitude correction value for leveling the amplitude characteristic of the second path 202; the ROM 44 constitutes second amplitude control means for controlling the attenuation amount of the second variable attenuator 36 to control the amplitude of a signal passing the second path 202; the ROM 45 constitutes first amplitude control means for controlling the attenuation amount of the first variable attenuator 32 to control the amplitude of a signal passing the first path 202; and the ROM 46 constitutes level control means for controlling the attenuation amount of the amplitude of a signal at the variable attenuator 39.

Digital to analog (D/A) converters 47 to 52 each serving as digital to analog conversion means convert digital outputs of the ROMs 41 to 46 into analog signals, respectively.

An analog addition circuit 53 includes an operational amplifier and a resistor and adds amplitude correction value data from the digital to analog converter 49 and amplitude attenuation amount data from the digital to analog converter 50.

The control section 40 indicates common address information to the ROMS 41, 42 and 43, and the address indication function is a same function as the frequency information detection means for detecting notch frequency information. In particular, since a notch frequency is determined from a phase variation amount at the infinite phase shifter 35, the control section 40 can use an address designated for the ROMs 41 and 42 as notch frequency information, and accordingly, the ROM 43 can output amplitude correction value data corresponding to a notch frequency using the same address as that of the ROMs 41 and 42.

Figure 14:
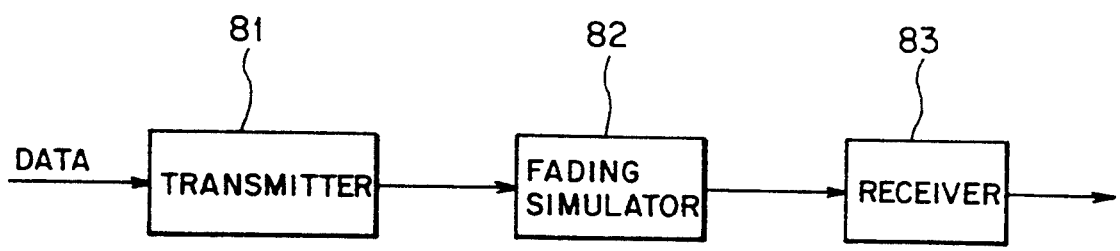
FIG. 14 is a diagrammatic view illustrating a fading simulator in use.
Figure 15:
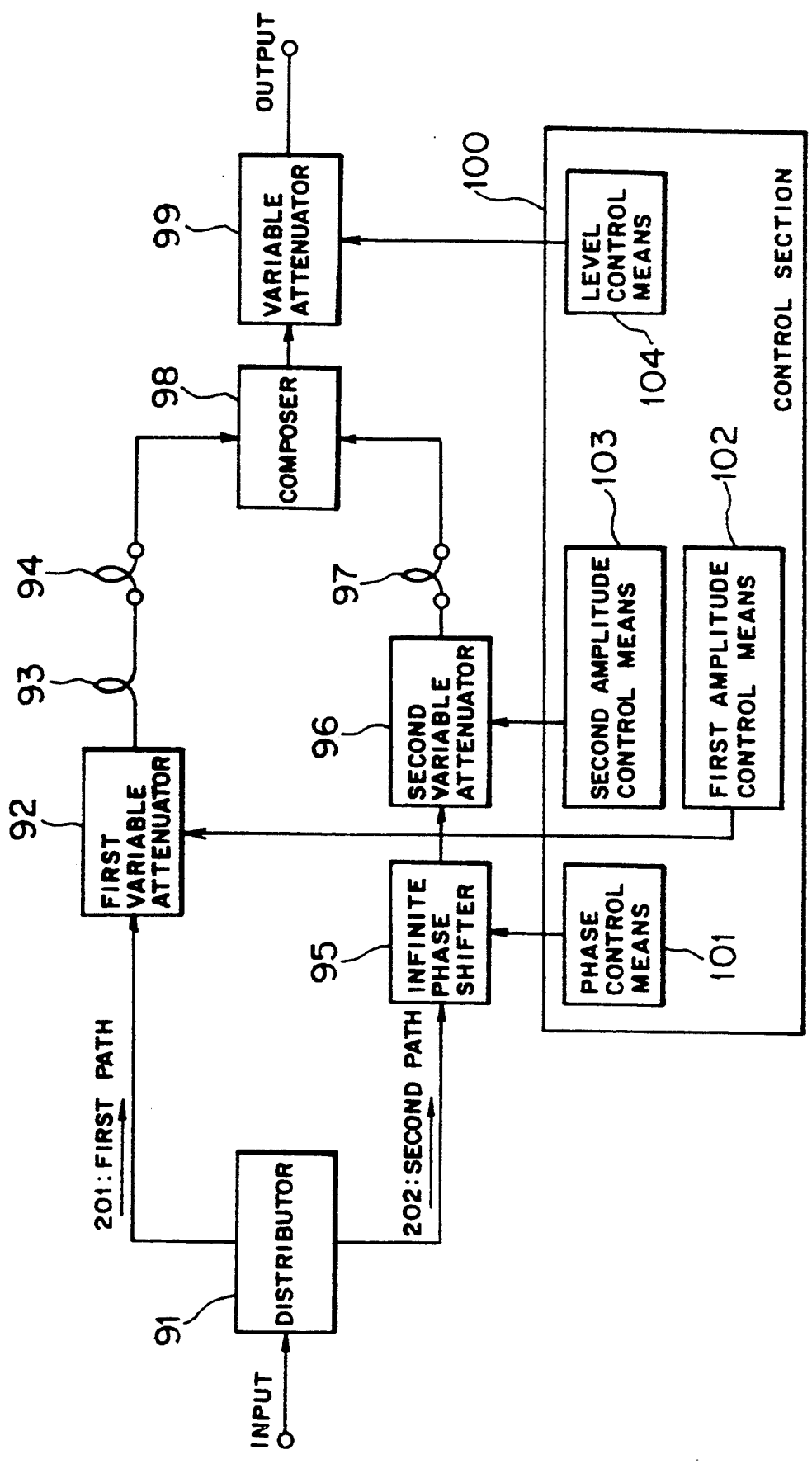
FIG. 15 is a block diagram showing a construction of the fading simulator of FIG. 14.
Figure 16A:
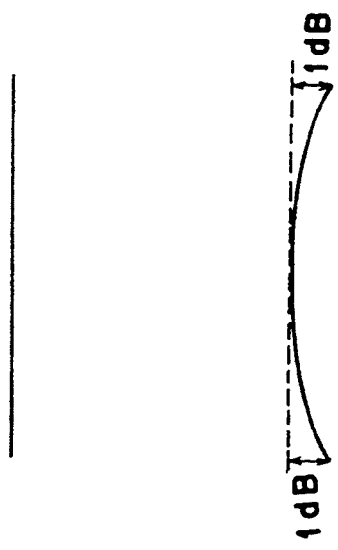
FIGS. 16(a) to 16(b) are waveform diagrams illustrating a notch characteristic of the fading simulator of FIG. 15.
Figure 16B:
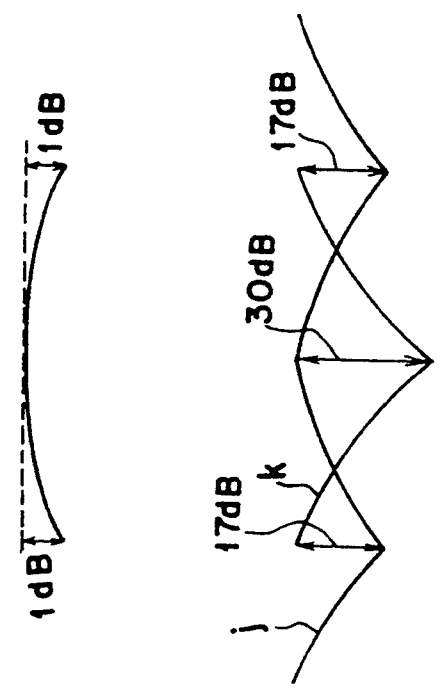
Figure 16C:

When a performance test of a radio system with regard to fading is to be conducted using the fading simulator having such construction as described above, the fading simulator is interposed between a transmitter and a receiver as seen in FIG. 14.

In the test, an input signal from the transmitter to the fading simulator is distributed to the first and second paths 201 and 202 by the distributor 31 of the fading simulator. In the first path 201, the input signal is attenuated in amplitude by the first variable attenuator 32 and then delayed by the delay compensator 33 and the delay element 34. Meanwhile, in the second path 202, the input signal is varied in phase by the infinite phase shifter 35 and then attenuated in amplitude by the second variable attenuator 36, whereafter it is delayed by the delay element 37. The signals having passed the first and second paths 201 and 202 are composed by the composer 38, and the thus composed signal is attenuated in amplitude by the variable attenuator 39 and then outputted.

The attenuation amount at the first variable attenuator 32 is controlled by inputting, to the first variable attenuator 32, analog data obtained by digital to analog conversion by the digital to analog converter 51 of digital data stored at an address of the ROM 45 designated by the control section 40.

Figure 4:
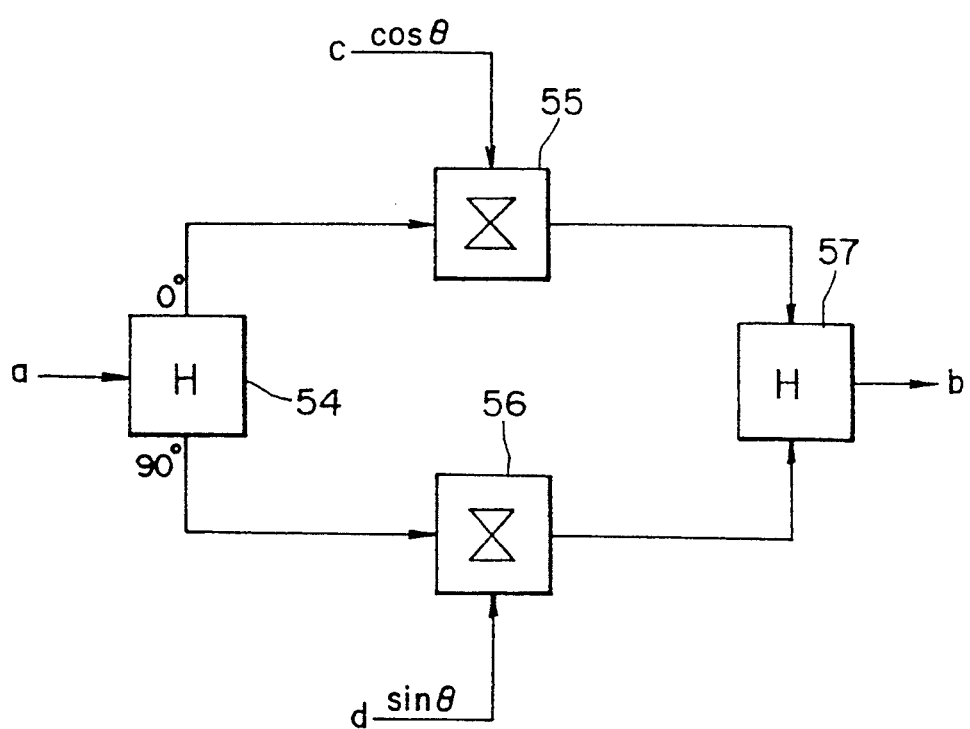
FIG. 4 is a circuit diagram showing an infinite phase shifter of the fading simulator shown in FIG. 3.

Meanwhile, the phase variation amount at the infinite phase shifter 35 is controlled by inputting, to the infinite phase shifter 35, analog data obtained by digital to analog conversion by the digital to analog converters 47 and 48 of digital data outputted from addresses of the ROMS 41 and 42, respectively, designated by the control section 40. FIG. 4 illustrates details of the infinite phase shifter 35. In FIG. 4, reference characters a, b, c and d correspond to reference characters a, b, c and d indicated in FIG. 3, respectively. Referring to FIG. 4, a distributor (hybrid circuit) 54 outputs an input signal as it is from one of a pair of outputs thereof, but outputs, from the other output thereof, the input signal after the phase of it is changed by 90°.

A mixer 55 mixes or multiplies an input signal to the infinite phase shifter 35 by cosine wave data outputted from the ROM 41 and converted into analog data by the digital to analog converter 47, and another mixer 56 mixes or multiplies an input signal to the infinite phase shifter 35 after variation in phase by 90° by sine wave data outputted from the ROM 42 and converted into analog data by the digital to analog converter 48.

A composer (hybrid circuit) 57 composes the outputs of the mixers 56 and 57.

Accordingly, the distributor 54 outputs an input signal as it is to the mixer 55, but outputs the input signal after variation in phase by 90° to the mixer 56, and the mixer 55 multiplies the input signal by cosine wave data while the mixer 56 multiplies the input signal of the phase different by 90° by sine wave data. Then, the outputs of the mixers 55 and 56 are composed by the composer 57, thereby obtaining an output signal which has a phase varied by an arbitrary amount from the input signal.

Referring back to FIG. 3, it is to be noted that, since a notch frequency is determined from a phase variation amount at the infinite phase shifter 35, an address designated by the control section 40 for the ROMs 41 and 42 can be used as notch frequency information, and accordingly, the ROM 43 outputs amplitude correction value data corresponding to the notch frequency using the same address as that of the ROMs 41 and 42.

Further, the attenuation amount at the second variable attenuator 36 is controlled by inputting to the second variable attenuator 36 a signal obtained by adding, by means of the addition circuit 53, amplitude attenuation amount data obtained by conversion into analog data by the digital to analog converter 50 of digital data stored at an address of the ROM 44 designated by the control section 40 and amplitude correction value data obtained by conversion into analog data by the digital to analog converter 49 of digital data stored at the same address of the ROM 43 as that designated by the control section 40 for the ROMs 41 and 42.

The attenuation amount at the variable attenuator 39 is controlled by inputting to the variable attenuator 39 analog data obtained by digital to analog conversion by the digital to analog converter 52 of digital data stored at an address of the ROM 46 designated by the control section 46.

The output of the variable attenuator 39 is transmitted to the receiver.

Consequently, with the fading simulator, a performance test of a radio system with regard to fading can be performed by artificially generating fading and inputting the output of the fading simulator to the receiver of the radio system.

Figure 5A:
FIGS. 5(a) to 5(c) are waveform diagrams illustrating a notch characteristic of the fading simulator of FIG. 3.
Figure 5B:
Figure 5C:
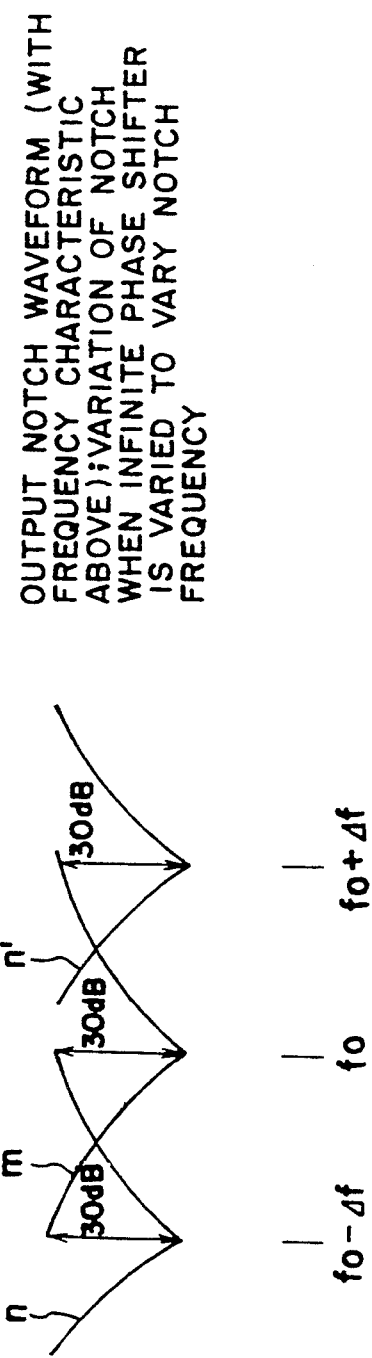

The notch characteristic of the fading simulator of the first embodiment is illustrated in FIGS. 5(a) to 5(c). In particular, FIG. 5(a) illustrates the frequency characteristic of the first path 201. While the second path 202 has such a frequency characteristic wherein the frequency is varied by 1 dB at a frequency $f_0 \pm \Delta f$ with respect to that at $f_0$ by the characteristic of the infinite phase shifter 35 as indicated by a solid line curve s in FIG. 5(b), since such a variation as indicated by a broken line curve t in FIG. 5(b) is added as an amplitude correction value, such a flat frequency amplitude characteristic as indicated by a straight line u in FIG. 5(b) is obtained. Consequently, even if the notch frequency is varied from $f_0$ to $f_0 - \Delta f$, a notch characteristic similar to that at the notch frequency of $f_0$ indicated by a curve m in FIG. 5(c) is obtained as indicated by a curve n in FIG. 5(c) by applying to the second variable attenuator 36 a control signal for correcting the amplitude variation (1 dB) in accordance with the notch frequency. It is to be noted that, also when the notch frequency is varied from $f_0$ to $f_0 + \Delta f$, a similar notch characteristic as indicted by a curve n' is obtained.

In this instance, since the amplitude ratio between the first and second paths 201 and 202 is corrected with a frequency at a notch point so that it may coincide with an amplitude ratio at $f_0$, some influence is had on the shape of a notch at any frequency other than that at the notch point. However, the influence is so little comparing with that of a variation of the attenuation amount of the notch point that there is no problem in use. Further, while, in the foregoing description, an amplitude variation caused by the characteristic of the infinite phase shifter 35 is described corrected completely, if there is no problem in use, the amplitude variation may be suppressed to some degree.

c. Description of the Second Embodiment

Figure 6:
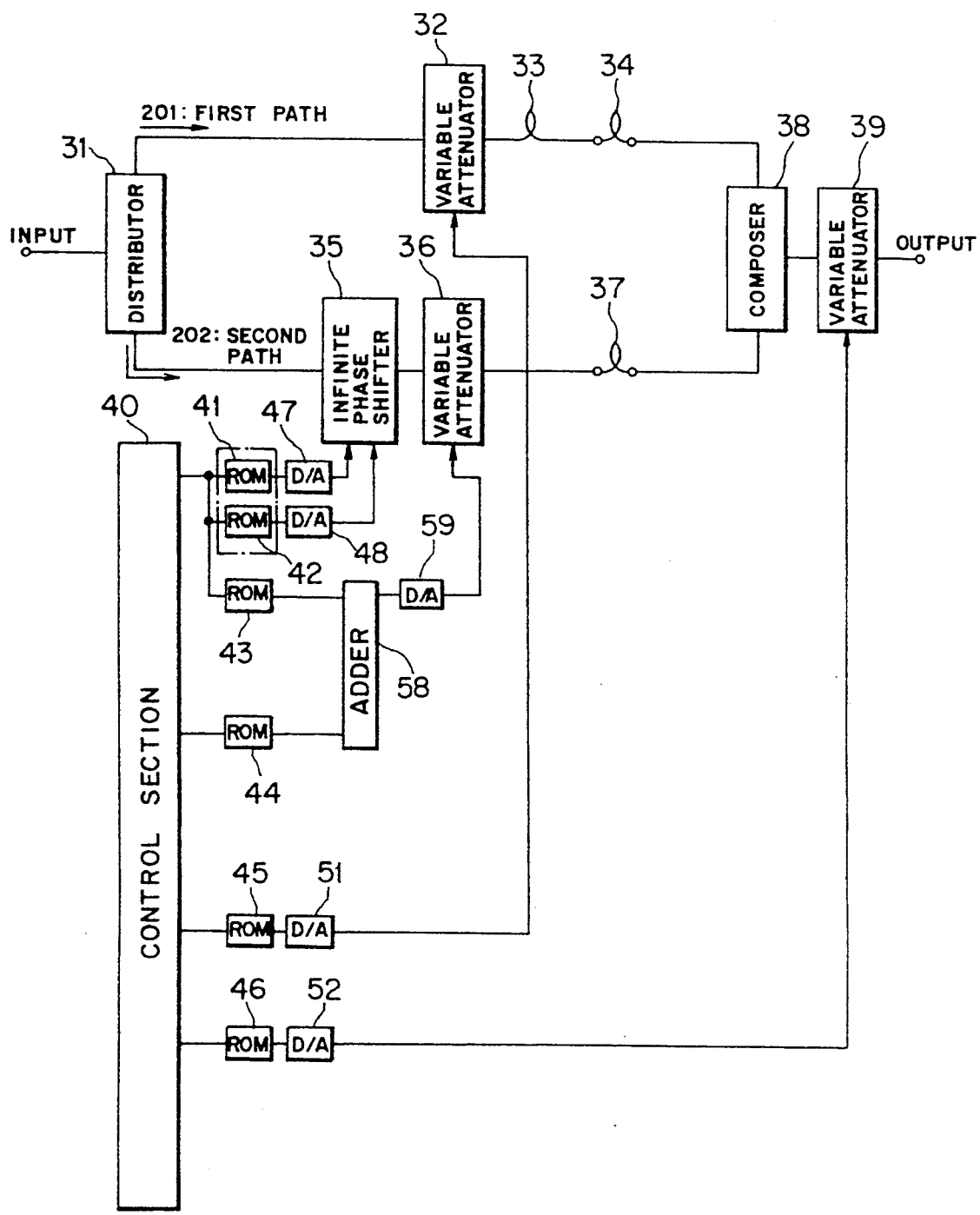
FIG. 6 is a block diagram of another fading simulator showing a second preferred embodiment of the present invention.

FIG. 6 shows a fading simulator according to a second preferred embodiment of the present invention. The present fading simulator is a modification and has somewhat common construction to the fading simulator described above with reference to FIG. 3 and includes several common components to the fading simulator. Overlapping description of such common construction and such common components will be omitted herein to avoid redundancy while only differences are described. This similarly applies to fading simulators of several embodiments of the present invention which are hereinafter described.

The present fading simulator is generally constructed, as a difference from the fading simulator of the first embodiment, such with that the output of the ROM 44 serving as second amplitude control means and the output of the ROM 43 serving as amplitude correction value setting means are digitally added before they are converted from analog into digital signals. To this end, the present fading simulator includes a digital adder 58 and a digital to analog (D/A) converter 59.

Here, the adder 58 adds the digital outputs of the ROMs 43 and 44, and the digital to analog converter 58 converts the output of the adder 58 into an analog signal.

In the fading simulator of the second embodiment, the attenuation amount at the second variable attenuator 36 is controlled by adding an amplitude correction value from the ROM 43 corresponding to a notch frequency and amplitude attenuation amount data from the ROM 44 while with they remain in digital data by the adder 58, converting a value obtained by the addition into analog data by the digital to analog converter 59 and inputting the analog data to the second variable attenuate or 36.

With the present fading simulator of the construction described above, a notch characteristic which does not depend upon a frequency can be obtained similarly as described above in connection with the fading simulator of the first embodiment.

d. Description of the Third Embodiment

Figure 7:
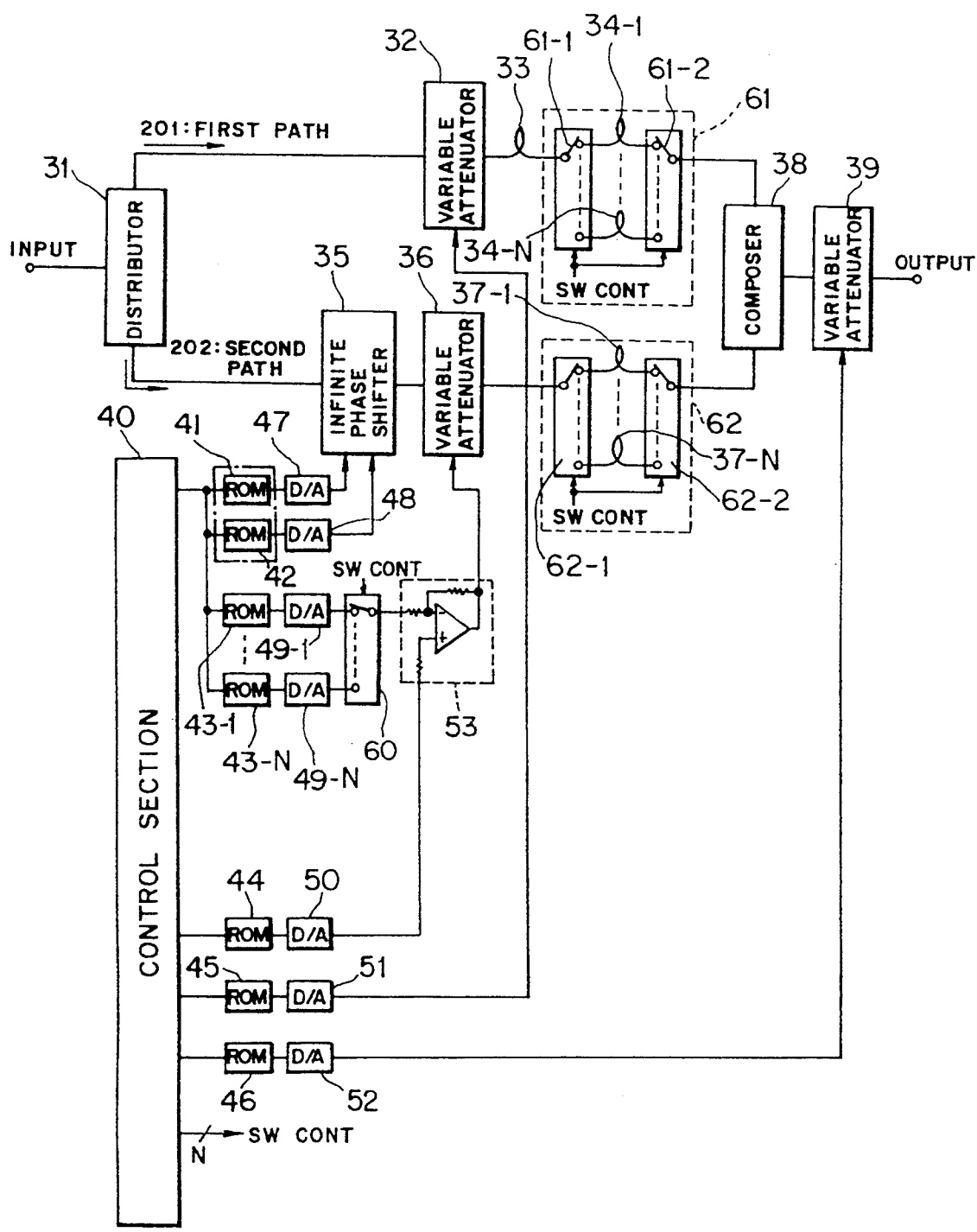
FIG. 7 is a block diagram of a further fading simulator showing a third preferred embodiment of the present invention.

FIG. 7 shows a fading simulator according to a third preferred embodiment of the present invention. In the fading simulator of the present embodiment, the first and second delay circuits are each constructed as a variable delay circuit. In particular, referring to FIG. 7, each of variable delay circuits 61 and 62 includes a plurality of delay elements 34-1 to 34-N or 37-1 to 37-N having different delay times, and a pair of selectors 61-1 and 61-2 or 62-1 and 62-2 for selecting one of the delay elements 34-1 to 34-N or 37-1 to 37-N.

Accordingly, the variable delay circuit 61 can select one of the delay elements 34-1 to 34-N in accordance with an instruction SWCONT received from the control section 40 while the variable delay circuit 62 can select one of the delay elements 37-1 to 37-N in accordance with the instruction SWCONT received from the control section 40.

Figure 8:
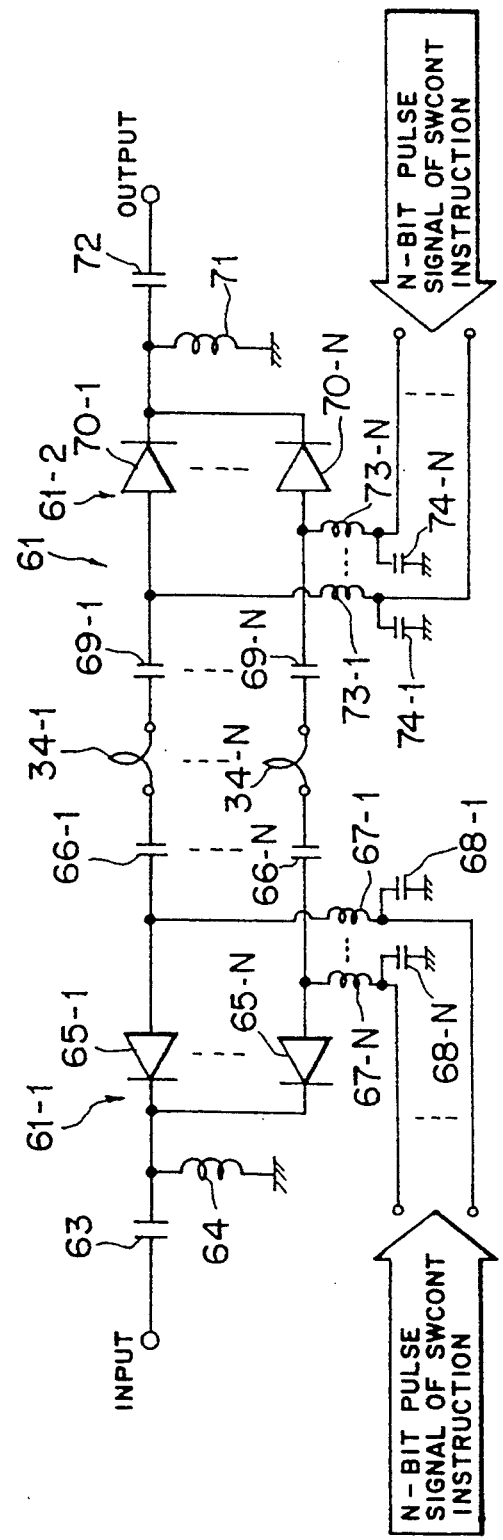
FIG. 8 is a circuit diagram illustrating a construction of a variable delay circuit of the fading simulator of FIG. 7

Here, the variable delay circuits 61 and 62 have similar constructions to each other, and the construction of the variable delay circuit 61 will be described below with reference to FIG. 8. The variable delay circuit 61 includes dc cutting capacitors 63, 66-1 to 66-N, 69-1 to 69-N and 72, capacitors 68-1 to 68-N and 74-1 to 74-N, coils 64, 67-1 to 67-N and 73-1 to 73-N, and PIN diodes 65-1 to 65-N and 70-1 to 70-N.

In the variable delay circuit 61, when an N-bit pulse signal of the instruction SWCONT from the control section 40 is received, a high level signal is applied to PIN diodes 65-i and 70-i ($1 \leq i \leq N$) from among the PIN diodes 65-1 to 65-N and 70-1 to 70-N, respectively, so that the PIN diodes 65-i and 70-i are put into an ON state to select a corresponding delay element 34-i.

Referring back to FIG. 7, the fading simulator further includes ROMs 43-1 to 43-N serving as a plurality of amplitude correction value setting sections for setting amplitude correction values for leveling different amplitude characteristics of the second path 202 obtained by selection of different ones of the delay elements 34-1 to 34-N and 37-1 to 37-N, digital to analog (D/A) converters 49-1 to 49-N for converting the outputs of the ROMs 43-1 to 43-N into analog signals. respectively, and a selector 60 for selecting one of the digital to analog converters 49-1 to 49-N, that is, one of the ROMs 43-1 to 43-N. The ROMs 43-1 to 43-N, the digital to analog converters 49-1 to 49-N and the selector 60 generally constitute second amplitude correction value setting means.

In particular, the ROMs 43-1 to 43-N store amplitude correction value data corresponding to the delay elements 34-1 to 34-N and 37-1 to 37-N, respectively. The switch 60 renders one of the outputs of the digital to analog converters 49-1 to 49-N effective in accordance with an instruction SWCONT (switch control signal) received from the control section 40.

In the fading simulator of the construction described above, the delay times of the first and second paths 201 and 202 are determined by the variable delay circuits 61 and 62 which select ones of the delay elements 34-1 to 34-N and 37-1 to 37-N, respectively, in accordance with an instruction SWCONT received from the control section 40, and the switch 60 selects a digital to analog conversion output of the ROM 43-i corresponding to the selected delay elements 34-i and 37-i in accordance with the instruction SWCONT. Consequently, amplitude correction value data outputted from the ROM 43-i and corresponding to a notch frequency are added to amplitude attenuation amount data, which are a digital to analog conversion output of the ROM 44, by the adder 53 and used for attenuation amount control at the second variable attenuator 36.

With the present fading simulator, a notch characteristic which does not depend upon a frequency as described hereinabove in connection with the first embodiment can be obtained. In addition, even if a delay element is exchanged, amplitude correction can be performed automatically without the necessity of replacement of a ROM.

e. Description of the Fourth Embodiment

Figure 9:
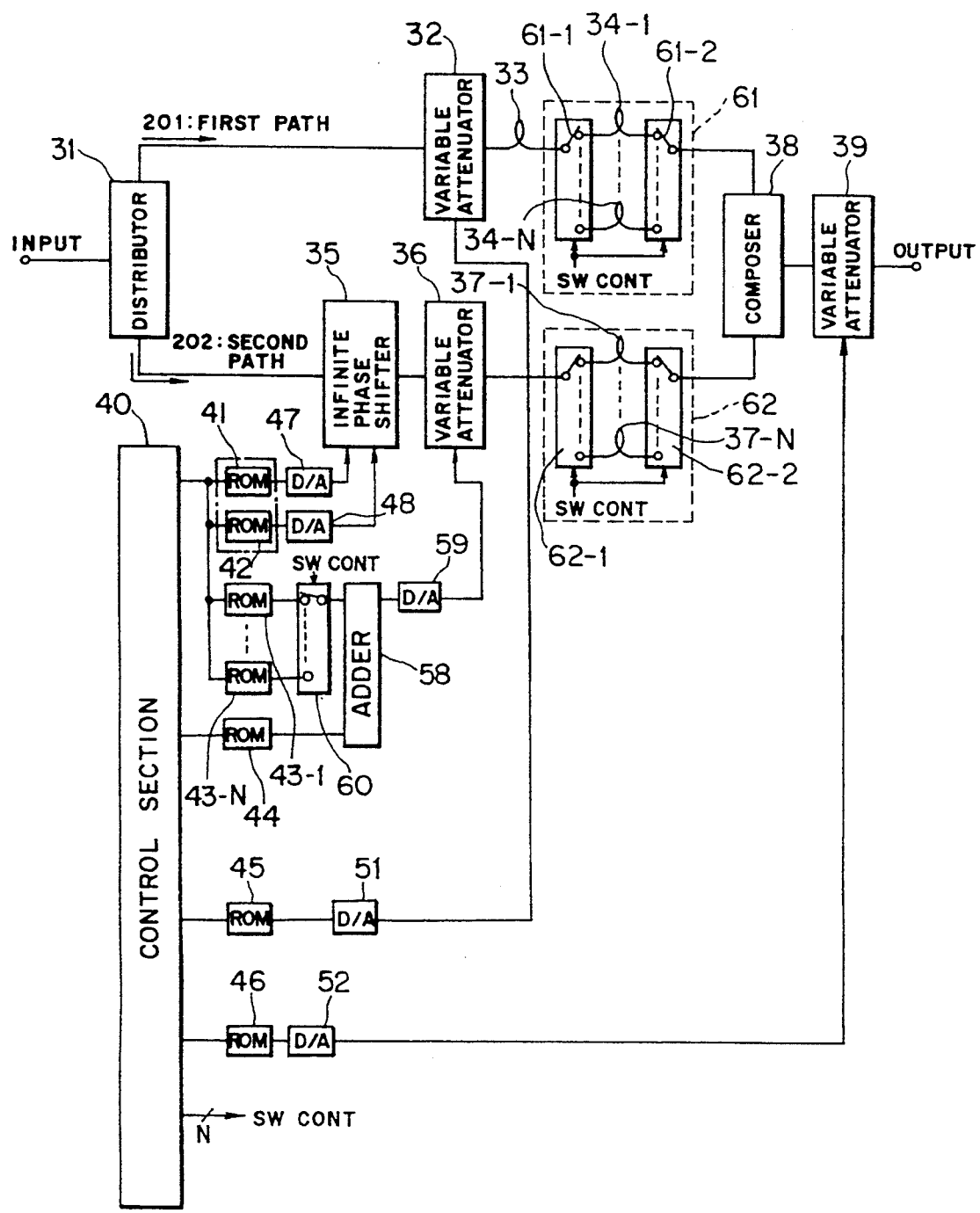
FIG. 9 is a block diagram of a still further fading simulator showing a fourth preferred embodiment of the present invention.

FIG. 9 shows a fading simulator according to a fourth preferred embodiment of the present invention. The fading simulator of the present embodiment is constructed such that digital amplitude correction value data outputted from a ROM 43-i corresponding to delay elements 34-i and 37-i selected by the variable delay circuits 61 and 62 and corresponding to a notch frequency are selected in accordance with an instruction SWCONT by the switch 60 and then added to digital amplitude attenuation amount data outputted from the ROM 44 by the digital adder 58, and data obtained by the addition are converted into analog data by the digital to analog converter 59 and then used for attenuation amount control at the second variable attenuator 36.

With the present fading simulator, similar effects to those of the fading simulator of the third embodiment can be obtained. In particular, a notch characteristic which does not depend upon a frequency as described hereinabove in connection with the first embodiment can be obtained, and besides, even if a delay element is exchanged, amplitude correction can be performed automatically without the necessity of replacement of a ROM.

f. Description of the Fifth Embodiment

Figure 10:
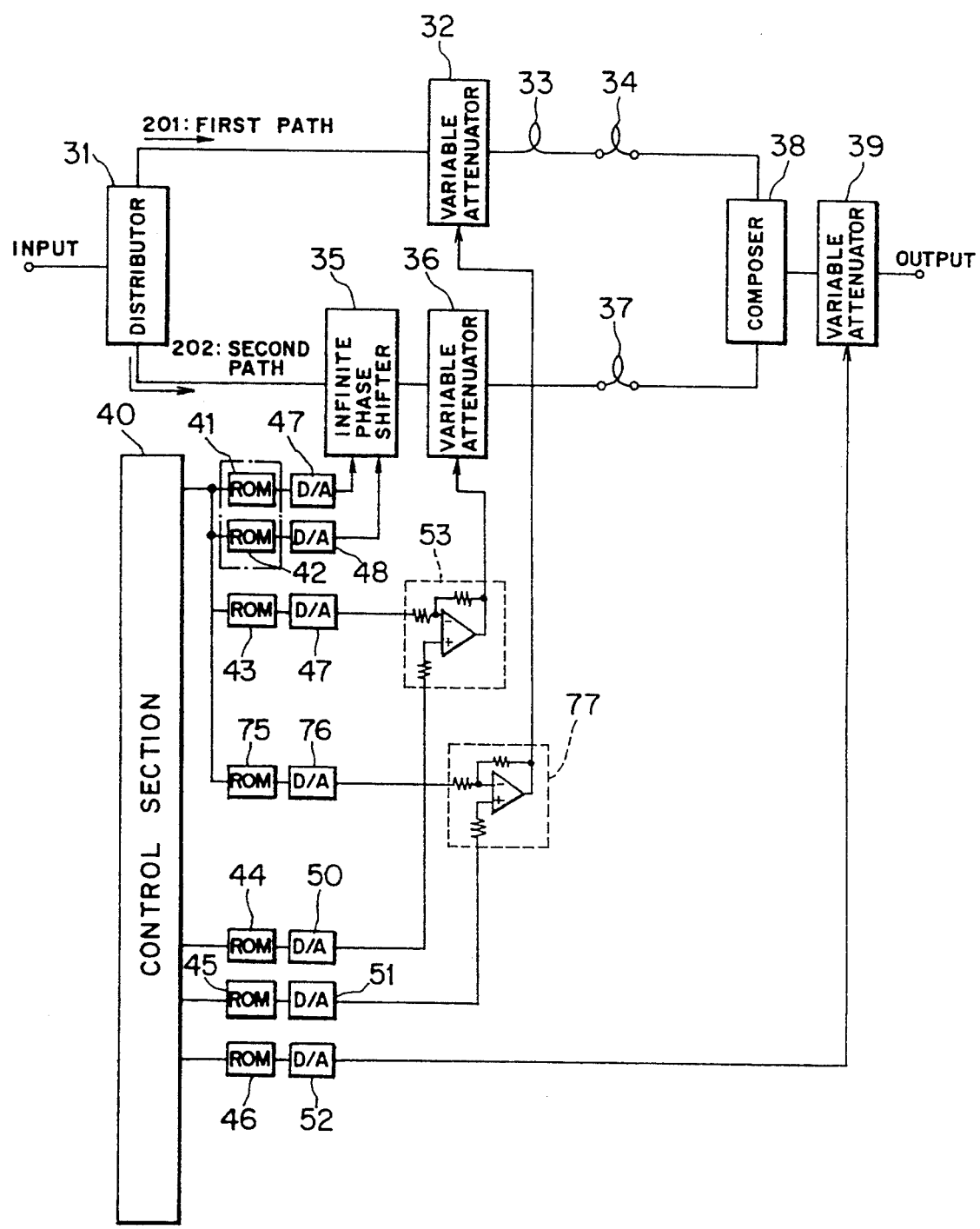
FIG. 10 is a block diagram of a yet further fading simulator showing a fifth preferred embodiment of the present invention.

FIG. 10 shows a fading simulator according to a fifth preferred embodiment of the present invention. In the fading simulator of the present embodiment, in addition to amplitude correction for leveling the amplitude characteristic of the second path 202, amplitude correction for leveling the amplitude characteristic of the first path 201 is performed. To this end, the fading simulator includes, in addition to the ROM 43 which constitutes second amplitude correction value setting means, another ROM 75 which constitutes first amplitude correction value setting means.

In particular, the ROM 75 stores amplitude correction value data for the first path 201 corresponding to notch frequencies. A digital output of the ROM 75 is converted into an analog signal by a digital to analog (D/A) converter 76. An addition circuit 77 adds amplitude correction value data from the digital to analog converter 76 and amplitude attenuation amount data from the digital to analog converter 51. The addition circuit 77 is constituted from an operational amplifier and a resister.

In the fading simulator of the construction described above, an amplitude correction value for the first path 201 outputted from the ROM 75 and corresponding to a notch frequency is converted into an analog signal by the digital to analog converter 76, and the analog signal is added by the addition circuit 77 to amplitude attenuation amount data outputted from the ROM 45. The addition output of the addition circuit 77 is used for attenuation amount control at the first variable phase shifter 32. Meanwhile, the addition output of the addition circuit 53 obtained by addition of amplitude attenuation amount data outputted from the ROM 44 to an analog value obtained by digital to analog conversion by the digital to analog converter 49 of an amplitude correction value for the second path 202 outputted from the ROM 43 and corresponding to a notch frequency is used for attenuation amount control at the second variable attenuator 36.

With the present fading simulator, similar effects to those of the fading simulators of the first and fifth embodiments can be obtained. In addition, since correction for leveling can be performed from any one of the two paths, universality in correction can be promoted.

g. Description of the Sixth Embodiment

Figure 11:
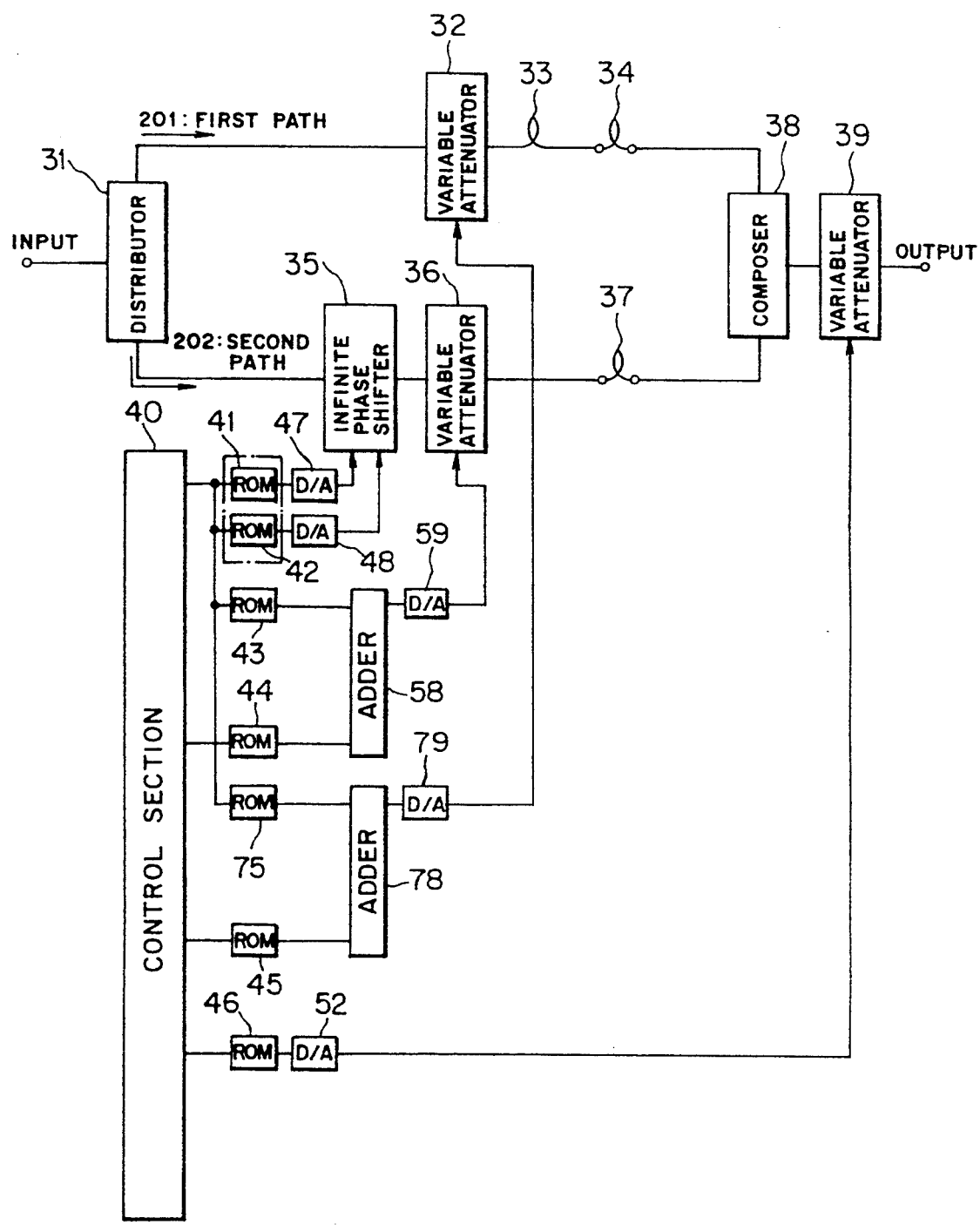
FIG. 11 is a block diagram of a yet further fading simulator showing a sixth preferred embodiment of the present invention.

FIG. 11 shows a fading simulator according to a sixth preferred embodiment of the present invention. In the fading simulator of the present embodiment, the output of the ROM 45 serving as first amplitude control means and the output of the ROM 75 serving as first amplitude correction value setting means are digitally added before they are converted from analog into digital signals, and the output of the ROM 44 serving as second amplitude control means and the output of the ROM 43 serving as second amplitude correction value setting means are digitally added before they are converted from analog into digital signals. To this end, the fading simulator includes ROMs 45, 75, 44 and 43, digital adders 78 and 58, and digital to analog (D/A) converters 79 and 59 are provided.

In the fading simulator, an amplitude correction value for the first path 201 from the ROM 75 corresponding to a notch frequency and amplitude attenuation amount data from the ROM 45 are added by the adder 78 while they remain in digital data, and then the addition output of the adder 78 is converted into an analog signal by the digital to analog converter 79. The analog signal is used for attenuation amount control at the first variable attenuator 32. Meanwhile, an analog value obtained by digital to analog conversion by the digital to analog converter 59 of the addition output of the addition circuit 58 obtained by addition of an amplitude correction value for the second path 202 outputted from the ROM 44 and corresponding to a notch frequency and amplitude attenuation amount data outputted from the ROM 43 while they remain in digital data is used for attenuation amount control at the second variable attenuator 36.

With the present fading simulator, similar effects to those of the fading simulators of the second and fifth embodiments can be obtained.

h. Description of the Seventh Embodiment

Figure 12:
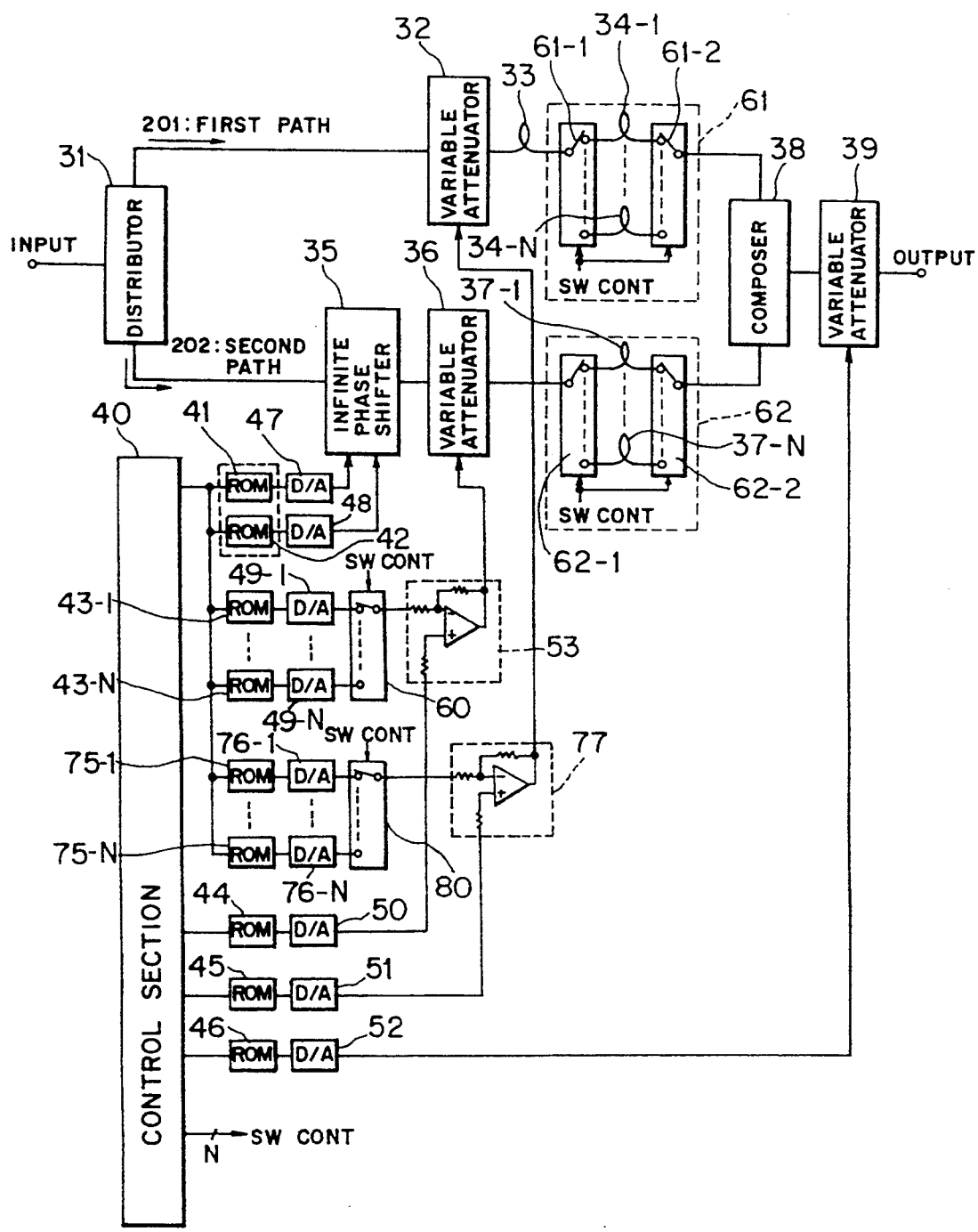
FIG. 12 is a block diagram of a yet further fading simulator showing a seventh preferred embodiment of the present invention.

FIG. 12 shows a fading simulator according to a seventh preferred embodiment of the present invention. In the fading simulator of the present embodiment, the first and second delay circuits are each constructed as a variable delay circuit, and each of the variable delay circuits 61 and 62 includes a plurality of delay elements 34-1 to 34-N or 37-1 to 37-N having different delay times, and a pair of selectors 61-1 and 61-2 or 62-1 and 62-2 for selecting one of the delay elements 34-1 to 34-N or 37-1 to 37-N. Further, the fading simulator includes ROMs 75-1 to 75-N serving as a plurality of amplitude correction value setting sections for setting amplitude correction values for leveling different amplitude characteristics of the first path 201 obtained by selection of different ones of the delay elements 34-1 to 34-N and 37-1 to 37-N, digital to analog (D/A) converters 76-1 to 76-N for converting the outputs of the ROMs 75-1 to 75-N into analog values, respectively, and a selector 80 for selecting one of the digital to analog converters 76-1 to 76-N, that is, one of the ROMS 75-1 to 75-N. The ROMs 75-1 to 75-N, the digital to analog converters 76-1 to 76-N and the selector 80 constitute first amplitude correction value setting means. The fading simulator further includes ROMs 43-1 to 43-N serving as a plurality of amplitude correction value setting sections for setting amplitude correction values for leveling different amplitude characteristics of the second path 202 obtained by selection of different ones of the delay elements 34-1 to 34-N and 37-1 to 37-N, digital to analog (D/A) converters 49-1 to 49-N for converting the outputs of the ROMs 43-1 to 43-N into analog values, and a selector 60 for selecting one of the digital converters 49-1 to 49-N, that is, one of the ROMs 43-1 to 43-N. The ROMs 43-1 to 43-N, the digital to analog converters 49-1 to 49-N and the selector 60 constitute second amplitude correction value setting means.

The ROMS 75-1 to 75-N and 43-1 to 43-N store amplitude correction value data corresponding to the delay elements 34-1 to 34-N and 37-1 to 37-N, respectively, and the switches 80 and 60 render ones of the outputs of the digital to analog converters 76-1 to 76-N and 49-1 to 49-N effective, respectively, in accordance with an instruction SWCONT (switch control signal) received from the control section 40.

In the fading simulator of the construction described above, a digital to analog conversion output of a ROM 75-i corresponding to delay elements 34-i and 37-i selected by the variable delay circuits 61 and 62, respectively, is selected in accordance with an instruction SWCONT by the switch 80, and amplitude correction value data outputted from the ROM 75-i and corresponding to a notch frequency are added by the addition circuit 77 to amplitude attenuation amount data which are a digital to analog conversion output of the ROM 45. The addition output of the addition circuit 77 is used for attenuation amount control at the first variable attenuator 32. Meanwhile, a digital to analog conversion output of a ROM 43-i corresponding to the delay elements 34-i and 37-i selected by the variable delay circuits 61 and 62 is selected in accordance with the instruction SWCONT by the switch 60, and amplitude correction value data outputted from the ROM 45-i and corresponding to the notch frequency are added by the addition circuit 53 to amplitude attenuation amount data which are a digital to analog conversion output of the ROM 44. The addition output of the addition circuit 53 is used for attenuation amount control at the second variable attenuator 36.

With the present fading simulator, similar effects to those of the fading simulators of the third and fifth embodiments can be obtained.

i. Description of the Eighth Embodiment

Figure 13:
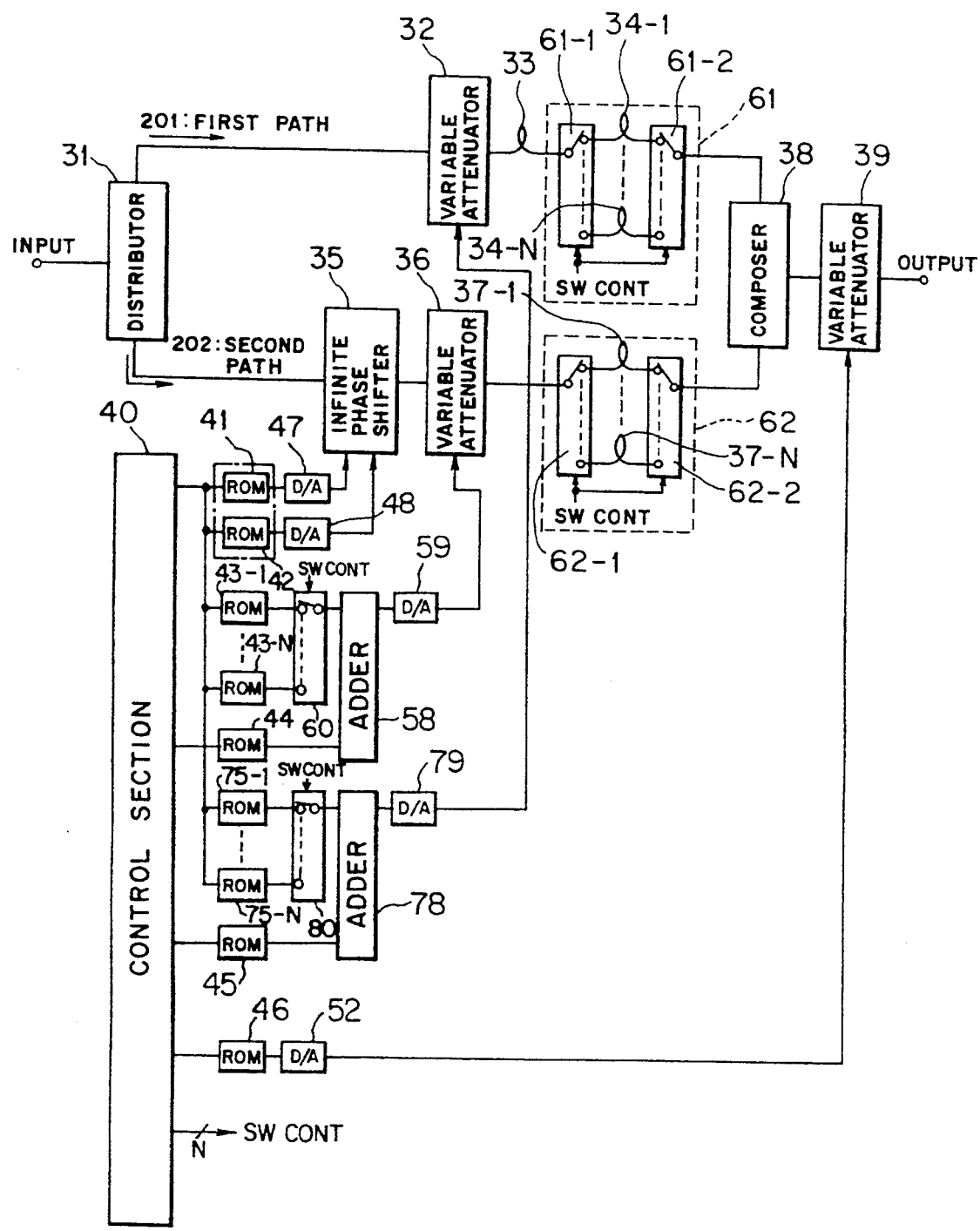
FIG. 13 is a block diagram of a yet further fading simulator showing an eighth preferred embodiment of the present invention.

FIG. 13 shows a fading simulator according to an eighth preferred embodiment of the present invention. In the fading simulator, digital amplitude correction value data outputted from a ROM 75-i corresponding to delay elements 34-i and 37-i selected by the variable delay circuits 61 and 62, respectively, and corresponding to a notch frequency are selected in accordance with an instruction SWCONT by the switch 80, and the digital amplitude correction value data are added by the adder 78 to digital amplitude attenuation amount data outputted from the ROM 45. The addition output of the adder 78 is converted into an analog value by the digital to analog converter 79 and then used for attenuation amount control at the first variable attenuator 32. Meanwhile, digital amplitude correction value data outputted from a ROM 43-i corresponding to the delay elements 34-i and 37-i selected by the variable delay circuits 61 and 62, respectively, and corresponding to a notch frequency are selected in accordance with the instruction SWCONT by the switch 60, and the digital amplitude correction value data are added by the adder 58 to digital amplitude attenuation amount data outputted from the ROM 44. The addition output of the adder 58 is converted into an analog value by the digital to analog converter 59 and then used for attenuation amount control at the second variable attenuator 36.

With the present fading simulator, similar effects to those of the fading simulators of the fourth and fifth embodiments can be obtained.

The present invention is not limited to the specifically described embodiment, and variations and modifications may be made without departing from the scope of the present invention.

What is claimed is:

1. A fading simulation method which uses a fading simulator interposed between a transmitter and a receiver of a radio system and including a distributor for distributing an input signal, a first path artificial circuit including a first variable attenuator and a first delay circuit for receiving the input signal distributed by said distributor, a second path artificial circuit including a variable phase shifter, a second variable attenuator and a second delay circuit for receiving the input signal distributed by said distributor, and a composer for composing signals from said first path artificial circuit and said second path artificial circuit, to conduct a performance test of said radio system for fading by inputting a signal from said transmitter to said fading simulator so as to artificially produce fading by said fading simulator and receiving the output of said fading simulator by said receiver, the method comprising the steps of:

inputting an input signal from said transmitter to said fading simulator, the input signal being distributed by said distributor so that it is inputted to said first path artificial circuit and said second path artificial circuit;

controlling, in said first path artificial circuit, the amount of attenuation of said first variable attenuator to control the amplitude of a signal passing said first path artificial circuit and delaying the passing signal by said first delay circuit;

controlling, in said second path artificial circuit, said variable phase shifter to control the phase of a signal passing said second path artificial circuit, controlling the amount of attenuation at said second variable attenuator in accordance with a signal obtained by addition to an amplitude control signal of an amplitude correction value set for leveling the amplitude characteristic of said second path artificial circuit in accordance with notch frequency information to control the amplitude of a signal passing said second path artificial circuit, and delaying the passing signal by said second delay circuit;

composing signals from said first path artificial circuit and said second path artificial circuit by said composer; and outputting a signal by the composer to said receiver.

2. A fading simulator, comprising:
a distributor for distributing an input signal;
first path artificial circuit including a first variable attenuator and a first delay circuit for receiving the input signal distributed by said distributor;
a second path artificial circuit including a variable phase shifter, a second variable attenuator and a second delay circuit for receiving the input signal distributed by said distributor;
a composer for composing signals from said first path artificial circuit and said second path artificial circuit;
first amplitude control means for controlling the amount of attenuation of said first variable attenuator to control the amplitude of signal passing said first path artificial circuit;
second amplitude control means for controlling the amount of attenuation of said second variable attenuator to control the amplitude of a signal passing said second path artificial circuit;
phase control means for controlling said variable phase shifter to control with he phase of a signal passing said second path artificial circuit;
frequency information detection means for detecting notch frequency information from variable phase shifter control information received from said phase control means;
amplitude correction value setting means for setting an amplitude correction value for leveling the amplitude characteristic of said second path artificial circuit in accordance with the notch frequency information detected by said frequency information detection means; and
addition means for adding the amplitude correction value set by said amplitude correction value setting means to a control signal from said second amplitude control means.

3. A fading simulator as claimed in claim 2, wherein each of said first amplitude control means and said second amplitude control means is constructed as storage means in which digital amplitude control data are stored at predetermined addresses while said phase control means is constructed as storage means in which digital phase control data are stored at predetermined addresses and said amplitude correction value setting means is constructed as storage means in which digital amplitude correction value data are stored at predetermined addresses, and means for indicating address information to said storage means constitutes said frequency information detection means.

4. A fading simulator as claimed in claim 3, further comprising digital to analog conversion means for converting digital outputs of the storage means constituting said second amplitude control means and said amplitude correction value setting means into analog data, and wherein said addition means is constructed as analog addition means for adding analog data after conversion by said digital to analog conversion means.

5. A fading simulator as claimed in claim 3, wherein said addition means is constructed as digital addition means for adding digital outputs of the storage means constituting said second amplitude control means and said amplitude correction value setting means, and further comprising digital to analog conversion means for converting a digital output of said digital addition means into analog data.

6. A fading simulator as claimed in claim 2, wherein said first delay circuit and said second delay circuit are each constructed as a variable delay circuit.

7. A fading simulator as claimed in claim 6, wherein each of the variable delay circuits includes a plurality of delay elements having different delay times and a selector for selecting one of said delay elements. and said amplitude correction value setting means includes a plurality of amplitude correction value setting sections for setting amplitude correction values for leveling different amplitude characteristics of said second path artificial circuit obtained by selection of different ones of the delay elements, and a selector for selecting one of said amplitude correction value setting sections.

8. A fading simulation method which uses a fading simulator interposed between a transmitter and a receiver of a radio system and including a distributor for distributing an input signal, a first path artificial circuit including a first variable attenuator and a first delay circuit for receiving the input signal distributed by said distributor, a second path artificial circuit including a variable phase shifter, a second variable attenuator and a second delay circuit for receiving the input signal distributed by said distributor, and a composer for composing signals from said first path artificial circuit and said second path artificial circuit, to conduct a performance test of said radio system for fading by inputting a signal from said transmitter to said fading simulator so as to artificially produce fading by said fading simulator and receiving the output of said fading simulator by said receiver, the method comprising the steps of:

inputting an input signal from said transmitter to said fading simulator, the input signal being distributed by said distributor so that it is inputted to said first path artificial circuit and said second path artificial circuit;

controlling, in said first path artificial circuit, the amount of attenuation of said first variable attenuator in accordance with a signal obtained by addition to a first amplitude control signal of an amplitude correction value set for leveling the amplitude characteristic of said first path artificial circuit in accordance with notch frequency information to control the amplitude of a signal passing said first path artificial circuit, and delaying the passing signal by said first delay circuit;

controlling, in said second path artificial circuit, said variable phase shifter to control the phase of a signal passing said second path artificial circuit, controlling the amount of attenuation at said second variable attenuator in accordance with a signal obtained by addition to a second amplitude control signal of an amplitude correction value set for leveling the amplitude characteristic of said second path artificial circuit in accordance with notch frequency information to control the amplitude of a signal passing said second path artificial circuit, and delaying the passing signal by said second delay circuit;

composing signals from said first path artificial circuit and said second path artificial circuit by said composer; and outputting a signal by the composer to said receiver.

9. A fading simulator, comprising:
a distributor for distributing an input signal:
first path artificial circuit including a first variable attenuator and a first delay circuit for receiving the input signal distributed by said distributor;
a second path artificial circuit including a variable phase shifter, a second variable attenuator and a second delay circuit for receiving the input signal distributed by said distributor;
a composer for composing signals from said first path artificial circuit and said second path artificial circuit;
first amplitude control means for controlling the amount of attenuation of said first variable attenuator to control the amplitude of signal passing said first path artificial circuit;
second amplitude control means for controlling the amount of attenuation of said second variable attenuator to control the amplitude of a signal passing said second path artificial circuit;
phase control means for controlling said variable phase shifter to control the phase of a signal passing said second path artificial circuit;
frequency information detection means for detecting notch frequency information from variable phase shifter control information received from said phase control means;
first amplitude correction value setting means for setting an amplitude correction value for leveling the amplitude characteristic of said first path artificial circuit in accordance with the notch frequency information detected by said frequency information detection means;
first addition means for adding the amplitude correction value set by said first amplitude correction value setting means to a control signal from said first amplitude control means;
second amplitude correction value setting means for setting an amplitude correction value for leveling the amplitude characteristic of said second path artificial circuit in accordance with the notch frequency information detected by said frequency information detection means: and
second addition means for adding the amplitude correction value set by said second amplitude correction value setting means to a control signal from said second amplitude control means.

10. A fading simulator as claimed in claim 9, wherein each of said first amplitude control means and said second amplitude control means is constructed as storage means in which digital amplitude control data are stored at predetermined addresses while said phase control means is constructed as storage means in which digital phase control data are stored at predetermined addresses and said first amplitude correction value setting means and said second amplitude correction value setting means are each constructed as storage means in which digital amplitude correction value data are stored at predetermined addresses, and means for indicating address information to said storage means constitutes said frequency information detection means.

11. A fading simulator as claimed in claim 10, further comprising first digital to analog conversion means for converting digital outputs of the storage means constituting said first amplitude control means and said first amplitude correction value setting means into analog data, said first addition means being constructed as analog addition means for adding analog data after conversion by said first digital to analog conversion means, and second digital to analog conversion means for converting digital outputs of the storage means constituting said second amplitude control means and said second amplitude correction value setting means into analog data, said second addition means being constructed as analog addition means for adding analog data after conversion by said second digital to analog conversion means.

12. A fading simulator as claimed in claim 10, wherein said first addition means is constructed as digital addition means for adding digital outputs of the storage means constituting said first amplitude control means and said first amplitude correction value setting means and said fading simulator further comprises third digital to analog conversion means for converting a digital output of said digital addition means into analog data and said second addition means is constructed as digital addition means for adding digital outputs of the storage means constituting said second amplitude control means and said second amplitude correction value setting means and said fading simulator further comprises fourth digital to analog conversion means for converting a digital output of said digital addition means into analog data.

13. A fading simulator as claimed in claim 9, wherein said first delay circuit and said second delay circuit are each constructed as a variable delay circuit.

14. A fading simulator as claimed in claim 13, wherein each of the variable delay circuits includes a plurality of delay elements having different delay times and a selector for selecting one of said delay elements, and said first amplitude correction value setting means includes a plurality of amplitude correction value setting sections for setting amplitude correction values for leveling different amplitude characteristics of said first path artificial circuit obtained by selection of different ones of the delay elements, and a selector for selecting one of said amplitude correction value setting sections while said second amplitude correction value setting means includes a plurality of amplitude correction value setting sections for setting amplitude correction values for leveling different amplitude characteristics of said second path artificial circuit obtained by selection of different ones of the delay elements, and a selector for selecting one of said amplitude correction value setting sections.

* * * * *